United States Patent
Sun

(10) Patent No.: US 12,001,080 B2
(45) Date of Patent: Jun. 4, 2024

(54) CAMERA OPTICAL LENS

(71) Applicant: AAC Optics (Changzhou) Co., Ltd., Changzhou (CN)

(72) Inventor: Wen Sun, Shenzhen (CN)

(73) Assignee: AAC Optics (Changzhou) Co., Ltd., Changzhou (CN)

( * ) Notice: Subject to any disclaimer, the term of this patent is extended or adjusted under 35 U.S.C. 154(b) by 583 days.

(21) Appl. No.: 17/131,784

(22) Filed: Dec. 23, 2020

(65) Prior Publication Data

US 2022/0011541 A1    Jan. 13, 2022

(30) Foreign Application Priority Data

Jul. 9, 2020 (CN) .......................... 202010654079.5

(51) Int. Cl.
| | | |
|---|---|---|
| G02B 13/06 | (2006.01) | |
| G02B 9/64 | (2006.01) | |
| G02B 13/18 | (2006.01) | |

(52) U.S. Cl.
CPC ............... *G02B 9/64* (2013.01); *G02B 13/18* (2013.01)

(58) Field of Classification Search
CPC ...... G02B 9/64; G02B 13/0045; G02B 13/18; G02B 15/1465
See application file for complete search history.

(56) References Cited

U.S. PATENT DOCUMENTS

| 2020/0400924 A1* | 12/2020 | Xu | G02B 13/06 |
| 2021/0181484 A1* | 6/2021 | Wang | G02B 13/06 |
| 2022/0003963 A1* | 1/2022 | Chen | G02B 13/18 |

FOREIGN PATENT DOCUMENTS

| CN | 108181701 A * | 6/2018 | G02B 13/0045 |
| WO | WO-2019165761 A1 * | 9/2019 | G02B 13/0045 |

* cited by examiner

*Primary Examiner* — Mustak Choudhury
*Assistant Examiner* — K Muhammad
(74) *Attorney, Agent, or Firm* — W&G Law Group

(57) ABSTRACT

A camera optical lens includes, from an object side to an image side, a first lens, a second lens, a third lens, a fourth lens, a fifth lens, a sixth lens, and a seventh lens. The camera optical lens satisfies: −4.50≤f4/f≤−2.00, and 0.65≤d5/d6≤19.50, where f denotes a focal length of the camera optical lens, f4 denotes a focal length of the fourth lens, d5 denotes an on-axis thickness of the third lens, and d6 denotes an on-axis distance from an image-side surface of the third lens to an object-side surface of the fourth lens. The camera optical lens has a good optical performance and meet the design requirements of being ultra-thin and having a wide angle and a large apertures.

8 Claims, 8 Drawing Sheets

CAMERA OPTICAL LENS

TECHNICAL FIELD

The present disclosure relates to the field of optical lens, and more particularly, to a camera optical lens suitable for handheld terminal devices such as smart phones or digital cameras and suitable for camera devices such as monitors or PC lenses.

BACKGROUND

With the development of camera lenses, requirements for lens imaging have become higher and higher, and "night scene photography" and "background blur" of the lens have also become important indicators to measure imaging of the lens. At present, rotationally symmetric aspherical surfaces are mostly used, such aspherical surfaces only have sufficient degrees of freedom in a meridian plane, and off-axis aberrations cannot be well corrected. In addition, refractive power setting, lens spacing, and lens shape settings are insufficient in existing structures, resulting in insufficient ultra-thin and insufficient wide-angle. A free-form surface is of a non-rotationally symmetric surface, which can better balance aberrations and improve imaging quality, and processing of the free-form surface is gradually mature. With the increase in requirements for lens imaging, it is very important to add the free-form surface when designing the lens, especially in designs of wide-angle lenses and ultra-wide-angle lenses.

SUMMARY

In view of the problems, the present disclosure aims to provide a camera lens, which can have characteristics of being ultra-thin and having a wide-angle and a large-aperture while achieving a good optical performance.

In an embodiment, the present disclosure provides a camera optical lens. The camera optical lens includes a first lens, a second lens, a third lens, a fourth lens, a fifth lens, a sixth lens, and a seventh lens that are sequentially arranged from an object side to an image side. At least one of the first lens, the second lens, the third lens, the fourth lens, the fifth lens, the sixth lens, or the seventh lens comprises a free-form surface. The camera optical lens satisfies: $-4.50 \leq f4/f \leq -2.00$, and $0.65 \leq d5/d6 \leq 19.50$, where f denotes a focal length of the camera optical lens, f4 denotes a focal length of the fourth lens, d5 denotes an on-axis thickness of the third lens, and d6 denotes an on-axis distance from an image-side surface of the third lens to an object-side surface of the fourth lens.

As an improvement, the camera optical lens further satisfies: $-5.20 \leq f7/f \leq -1.00$, where f7 denotes a focal length of the seventh lens.

As an improvement, the camera optical lens further satisfies: $2.50 \leq R11/R12 \leq 10.00$, where R11 denotes a central curvature radius of an object-side surface of the sixth lens, and R12 denotes a central curvature radius of an image-side surface of the sixth lens.

As an improvement, the camera optical lens further satisfies: $-3.66 \leq f1/f \leq -1.12$, $-0.58 \leq (R1+R2)/(R1-R2) \leq 1.69$, and $0.03 \leq d1/TTL \leq 0.20$, where f1 denotes a focal length of the first lens, R1 denotes a central curvature radius of an object-side surface of the first lens, R2 denotes a central curvature radius of an image-side surface of the first lens, d1 denotes an on-axis thickness of the first lens, and TTL denotes a total optical length from the object-side surface of the first lens to an image plane of the camera optical lens along an optic axis.

As an improvement, the camera optical lens further satisfies: $0.56 \leq f2/f \leq 5.62$, $-7.73 \leq (R3+R4)/(R3-R4) \leq 0.01$, and $0.02 \leq d3/TTL \leq 0.16$, where f2 denotes a focal length of the second lens, R3 denotes a central curvature radius of an object-side surface of the second lens, R4 denotes a central curvature radius of an image-side surface of the second lens, d3 denotes an on-axis thickness of the second lens, and TTL denotes a total optical length from an object-side surface of the first lens to an image plane of the camera optical lens along an optic axis.

As an improvement, the camera optical lens further satisfies: $-15.86 \leq f3/f \leq 3.45$, $-1.81 \leq (R5+R6)/(R5-R6) \leq 1.90$, and $0.02 \leq d5/TTL \leq 0.21$, where f3 denotes a focal length of the third lens, R5 denotes a central curvature radius of an object-side surface of the third lens, R6 denotes a central curvature radius of the image-side surface of the third lens, and TTL denotes a total optical length from an object-side surface of the first lens to an image plane of the camera optical lens along an optic axis.

As an improvement, the camera optical lens further satisfies: $-0.16 \leq (R7+R8)/(R7-R8) \leq 1.83$, and $0.02 \leq d7/TTL \leq 0.06$, where R7 denotes a central curvature radius of the object-side surface of the fourth lens, R8 denotes a central curvature radius of an image-side surface of the fourth lens, d7 denotes an on-axis thickness of the fourth lens, and TTL denotes a total optical length from an object-side surface of the first lens to an image plane of the camera optical lens along an optic axis.

As an improvement, the camera optical lens further satisfies: $1.20 \leq f5/f \leq 13.33$, $-2.17 \leq (R9+R10)/(R9-R10) \leq 0.30$, and $0.04 \leq d9/TTL \leq 0.15$, where f5 denotes a focal length of the fifth lens, R9 denotes a central curvature radius of an object-side surface of the fifth lens, R10 denotes a central curvature radius of an image-side surface of the fifth lens, d9 denotes an on-axis thickness of the fifth lens, and TTL denotes a total optical length from an object-side surface of the first lens to an image plane of the camera optical lens along an optic axis.

As an improvement, the camera optical lens further satisfies: $0.53 \leq f6/f \leq 2.95$, $0.61 \leq (R11+R12)/(R11-R12) \leq 2.60$, and $0.04 \leq d11/TTL \leq 0.17$, where f6 denotes a focal length of the sixth lens, R11 denotes a central curvature radius of an object-side surface of the sixth lens, R12 denotes a central curvature radius of an image-side surface of the sixth lens, d11 denotes an on-axis thickness of the sixth lens, and TTL denotes a total optical length from an object-side surface of the first lens to an image plane of the camera optical lens along an optic axis.

As an improvement, the camera optical lens further satisfies: $1.61 \leq (R13+R14)/(R13-R14) \leq 8.60$, and $0.03 \leq d13/TTL \leq 0.10$, where R13 denotes a central curvature radius of an object-side surface of the seventh lens, R14 denotes a central curvature radius of an image-side surface of the seventh lens, d13 denotes an on-axis thickness of the seventh lens, and TTL denotes a total optical length from an object-side surface of the first lens to an image plane of the camera optical lens along an optic axis.

The camera optical lens of the present disclosure has a good optical performance and has characteristic of being ultra-thin and having a wide-angle and a large aperture. At least one lens of the first to seventh lenses has a free-form surface, which can effectively correct aberrations and further improve the performance of the optical system. The camera optical lens is suitable for camera lens assembly of mobile phones and WEB camera lenses that are formed by imaging elements for high pixel, such as CCD and CMOS.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

The present disclosure will hereinafter be described in detail with reference to several exemplary embodiments. To make the technical problems to be solved, technical solutions and beneficial effects of the present disclosure more apparent, the present disclosure is described in further detail together with the figure and the embodiments. It should be understood the specific embodiments described hereby is only to explain the disclosure, not intended to limit the disclosure.

Embodiment 1

Figure 1:
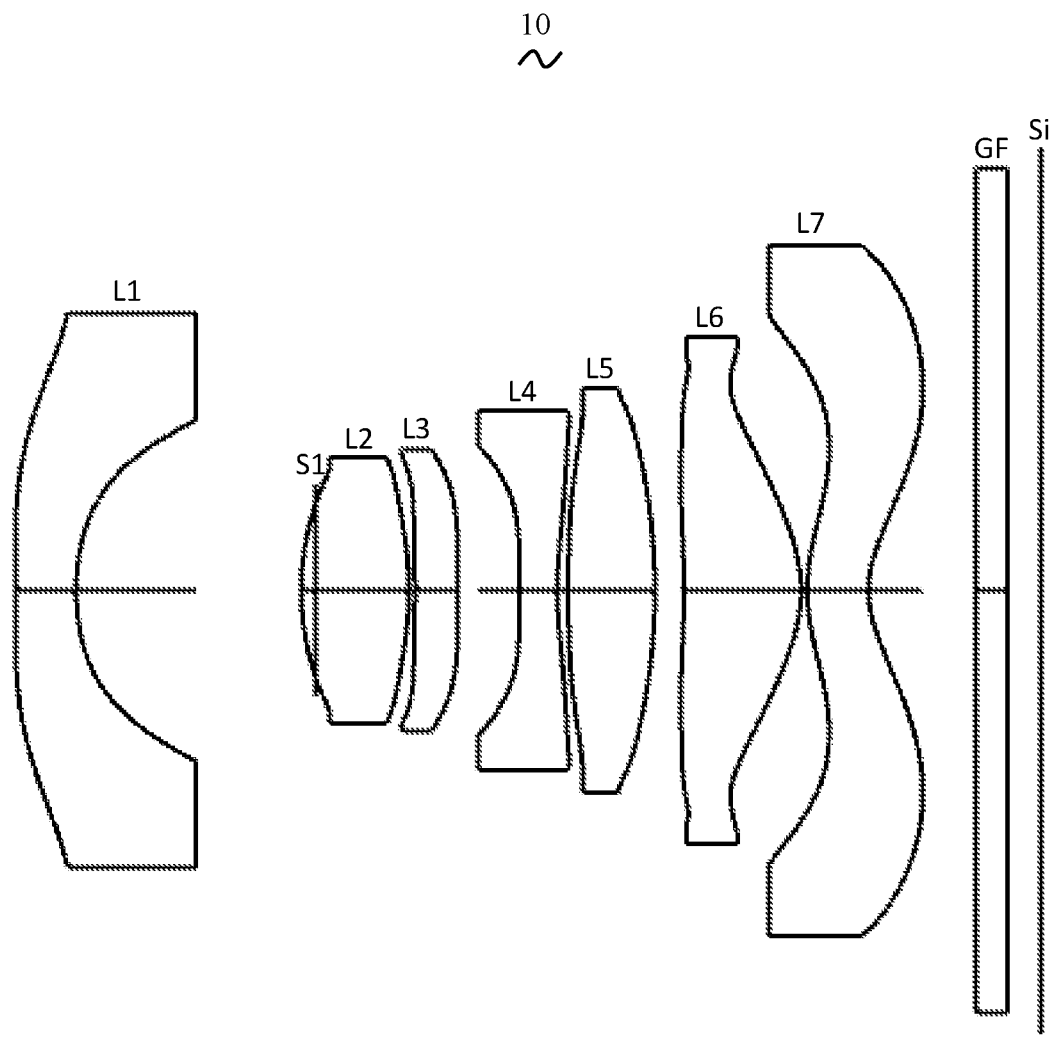
FIG. 1 is a schematic diagram of a structure of a camera optical lens in accordance with Embodiment 1 of the present disclosure.

Referring to FIG. 1, the present disclosure provides a camera optical lens 10. FIG. 1 shows the camera optical lens 10 according to Embodiment 1 of the present disclosure. Specifically, the camera optical lens 10 includes a first lens L1, an aperture S1, a second lens L2, a third lens L3, a fourth lens L4, a fifth lens L5, a sixth lens L6, and a seventh lens L7 that are sequentially arranged from an object side to an image side. An optical element such as an optical filter (GF) can be arranged between the seventh lens L7 and an image plane Si.

In this embodiment, the first lens L1 is made of a plastic material, the second lens L2 is made of a plastic material, the third lens L3 is made of a plastic material, the fourth lens L4 is made of a plastic material, the fifth lens L5 is made of a plastic material, the sixth lens L6 is made of a plastic material, and the seventh lens L7 is made of a plastic material. In other embodiments, each of the lenses can also be made of other materials.

A focal length of the camera optical lens 10 is defined as f, and a focal length of the four lens L4 is defined as f4. The camera optical lens 10 satisfies a condition of $-4.50 \leq f4/f \leq -2.00$, which specifies a ratio of the focal length f4 of the four lens L4 to the focal length f of the camera optical lens 10. This condition can improve the performance of the optical system. As an example, $-4.26 \leq f4/f \leq -2.07$.

In this embodiment, an on-axis thickness of the third lens L3 is defined as d5, and an on-axis distance from an image-side surface of the third lens L3 to an object-side surface of the fourth lens L4 is defined as d6. The camera optical lens 10 satisfies a condition of $0.65 \leq d5/d6 \leq 19.50$. When d5/d6 satisfies this condition, it is beneficial for lens processing and lens assembling.

In this embodiment, at least one of the first lens L1, the second lens L2, the third lens L3, the fourth lens L4, the fifth lens L5, the sixth lens L6, or the seventh lens L7 includes a free-form surface, which can effectively correct the system astigmatism and distortion.

As an example, the focal length of the imaging optical lens 10 is defined as f, a focal length of the seventh lens L7 is defined as f7, and the camera optical lens 10 satisfies a condition of $-5.20 \leq f7/f \leq -1.00$. When f7/f satisfies the condition, the refractive power of the seventh lens L7 can be effectively distributed, and the aberration of the optical system can be corrected, thereby improving the imaging quality. As an example, $-4.79 \leq f7/f \leq -1.22$.

As an example, a central curvature radius of an object-side surface of the sixth lens L6 is defined as R11, a central curvature radius of an image-side surface of the sixth lens L6 is defined as R12, and the camera optical lens 10 satisfies a condition of $2.50 \leq R11/R12 \leq 10.00$, which specifies a shape of the sixth lens L6. This condition can alleviate deflection degree of light passing through the lens while effectively reducing aberrations. As an example, $3.12 \leq R11/R12 \leq 9.97$.

In this embodiment, the first lens L1 has a negative refractive power, and it includes an object-side surface being concave in a paraxial region and an image-side surface being concave in the paraxial region.

As an example, a focal length of the first lens L1 is defined as f1, the focal length of the camera optical lens 10 is defined as f, and the camera optical lens 10 satisfies a condition of $-3.66 \leq f1/f \leq -1.12$, which specifics a ratio between the focal length f1 of the first lens L1 and the focal length f of the camera optical lens. When the condition is satisfied, the first lens L1 can have an appropriate negative refractive power, thereby reducing aberrations of the system while facilitating development towards ultra-thin and wide-angle lenses. As an example, $-2.29 \leq f1/f \leq -1.40$ As an example, a central curvature radius of the object-side surface of the first lens L1 is defined as R1, a central curvature radius of the image-side surface of the first lens L1 is defined as R2, and the camera optical lens 10 satisfies a condition of $-0.58 \leq (R1+R2)/(R1-R2) \leq 1.69$. This can reasonably control a shape of the first lens L1, so that the first lens L1 can effectively correct spherical aberrations of the system. As an example, $-0.36 \leq (R1+R2)/(R1-R2) \leq 1.35$.

As an example, an on-axis thickness of the first lens L1 is defined as d1, a total optical length from the object-side surface of the first lens L1 to an image plane of the camera optical lens 10 along an optic axis is defined as TTL, and the camera optical lens 10 satisfies a condition of $0.03 \leq d1/TTL \leq 0.20$. This can facilitate achieving ultra-thin lenses. As an example, $0.05 \leq d1/TTL \leq 0.16$.

The second lens L2 has a positive refractive power, and it includes an object-side surface being convex in a paraxial region and an image-side surface being convex in the paraxial region.

As an example, a focal length of the second lens L2 is defined as f2, the focal length of the camera optical lens 10 is defined as f, and the camera optical lens 10 further satisfies a condition of $0.56 \le f2/f \le 5.62$. By controlling the positive refractive power of the second lens L2 within a reasonable range, correction of aberrations of the optical system can be facilitated. As an example, $0.89 \le f2/f \le 4.50$.

As an example, a central curvature radius of the object-side surface of the second lens L2 is defined as R3, a central curvature radius of the image-side surface of the second lens L2 is defined as R4, and the camera optical lens 10 satisfies a condition of $-7.73 \le (R3+R4)/(R3-R4) \le 0.01$, which specifies a shape of the second lens L2. This can facilitate correction of an on-axis aberration with development towards ultra-thin lenses. As an example, $-4.83 \le (R3+R4)/(R3-R4) \le 0.01$.

As an example, an on-axis thickness of the second lens L2 is defined as d3, the total optical length from the object-side surface of the first lens L1 to an image plane of the camera optical lens 10 along an optic axis is defined as TTL, and the camera optical lens 10 satisfies a condition of $0.02 \le d3/TTL \le 0.16$. Such configuration can facilitate achieving ultra-thin lenses. As an example, $0.04 \le d3/TTL \le 0.13$.

The third lens L3 has a negative refractive power, and it includes an object-side surface being concave in a paraxial region and an image-side surface being concave in the paraxial region.

As an example, the focal length of the camera optical lens 10 is f, a focal length of the third lens L3 is f3, and the camera optical lens 10 satisfies a condition of $-15.86 \le f3/f \le 3.45$. The appropriate distribution of the refractive power leads to better imaging quality and a lower sensitivity of the system. As an example, $-9.91 \le f3/f \le 2.76$.

As an example, a central curvature radius of the object-side surface of the third lens L3 is defined as R5, a central curvature radius of the image-side surface of the third lens L3 is defined as R6, and the camera optical lens 10 satisfies a condition of $-1.81 \le (R5+R6)/(R5-R6) \le 1.90$. Such condition can effectively control a shape of the third lens L3. This condition can alleviate the deflection of light passing through the lens while effectively reducing aberrations. As an example, $-1.13 \le (R5+R6)/(R5-R6) \le 1.52$.

As an example, an on-axis thickness of the third lens L3 is defined as d5, the total optical length from the object-side surface of the first lens L1 to an image plane of the camera optical lens 10 along an optic axis is defined as TTL, and the camera optical lens 10 satisfies a condition of $0.02 \le d5/TTL \le 0.21$. This can facilitate achieving ultra-thin lenses. As an example, $0.03 \le d5/TTL \le 0.17$.

In this embodiment, the fourth lens L4 has a negative refractive power, and it includes an object-side surface being convex in a paraxial region and an image-side surface being concave in the paraxial region.

As an example, a central curvature radius of the object-side surface of the fourth lens L4 is defined as R7, a central curvature radius of the image-side surface of the fourth lens L4 is defined as R8, and the camera optical lens 10 satisfies a condition of $-0.16 \le (R7+R8)/(R7-R8) \le 1.83$, which specifies a shape of the fourth lens L4. This can facilitate correction of an off-axis aberration with development towards ultra-thin and wide-angle lenses. As an example, $-0.10 \le (R7+R8)/(R7-R8) \le 1.47$.

As an example, an on-axis thickness of the fourth lens L4 is defined as d7, and the total optical length from the object-side surface of the first lens L1 to an image plane of the camera optical lens 10 along an optic axis is defined as TTL. The camera optical lens 10 satisfies a condition of $0.02 \le d7/TTL \le 0.06$. Such configuration can facilitate achieving ultra-thin lenses. As an example, $0.03 \le d7/TTL \le 0.05$.

In this embodiment, the fifth lens L5 has a positive refractive power, and it includes an object-side surface being convex in a paraxial region and an image-side surface being convex in the paraxial region.

As an example, a focal length of the fifth lens L5 is f5, the focal length of the camera optical lens 10 is f, and the camera optical lens 10 further satisfies a condition of $1.20 \le f5/f \le 13.33$. This condition can effectively make a light angle of the camera optical lens 10 gentle and reduce the tolerance sensitivity. As an example, $1.92 \le f5/f \le 10.66$.

As an example, a central curvature radius of the object-side surface of the fifth lens L5 is defined as R9, a central curvature radius of the image-side surface of the fifth lens L5 is defined as R10, and the camera optical lens 10 satisfies a condition of $-2.17 \le (R9+R10)/(R9-R10) \le 0.30$, which specifies a shape of the fifth lens L5. This can facilitate correction of an off-axis aberration with development towards ultra-thin and wide-angle lenses. As an example, $-1.36 \le (R9+R10)/(R9-R10) \le 0.24$.

As an example, an on-axis thickness of the fifth lens L5 is defined as d9, the total optical length from the object-side surface of the first lens L1 to an image plane of the camera optical lens 10 along an optic axis is defined as TTL, and the camera optical lens 10 satisfies a condition of $0.04 \le d9/TTL \le 0.15$, which can facilitate achieving ultra-thin lenses. As an example, $0.06 \le d9/TTL \le 0.12$.

The sixth lens L6 has a positive refractive power, and it includes an object-side surface being concave in a paraxial region and an image-side surface being convex in the paraxial region.

As an example, a focal length of the sixth lens L6 is f6, the focal length of the camera optical lens 10 is f, and the camera optical lens 10 further satisfies a condition of $0.53 \le f6/f \le 2.95$. The appropriate distribution of the refractive power leads to better imaging quality and a lower sensitivity of the system. As an example, $0.85 \le f6/f \le 2.36$.

As an example, a central curvature radius of the object-side surface of the sixth lens L6 is defined as R11, a central curvature radius of the image-side surface of the sixth lens L6 is defined as R12, and the camera optical lens 10 satisfies a condition of $0.61 \le (R11+R12)/(R11-R12) \le 2.60$, which specifies a shape of the sixth lens L6. This can facilitate correction of an off-axis aberration with development towards ultra-thin, wide-angle lenses. As an example, $0.98 \le (R11+R12)/(R11-R12) \le 2.08$.

An on-axis thickness of the sixth lens L6 is defined as d11, and the total optical length from the object-side surface of the first lens L1 to an image plane of the camera optical lens 10 along an optic axis is defined as TTL. The camera optical lens 10 satisfies a condition of $0.04 \le d11/TTL \le 0.17$. This can facilitate achieving ultra-thin lenses. As an example, $0.06 \le d11/TTL \le 0.14$.

The seventh lens L7 has a negative refractive power, and it includes an object-side surface being convex in a paraxial region and an image-side surface being concave in the paraxial region.

As an example, a central curvature radius of the object-side surface of the seventh lens L7 is defined as R13, a central curvature radius of the image-side surface of the seventh lens L7 is defined as R14, and the camera optical lens 10 satisfies a condition of 1.61≤(R13+R14)/(R13-R14)≤8.60, which specifies a shape of the seventh lens L7. This can facilitate correction of an off-axis aberration with development towards ultra-thin and wide-angle lenses. As an example, 2.58≤(R13+R14)/(R13-R14)≤6.88.

As an example, an on-axis thickness of the seventh lens L7 is defined as d13, the total optical length from the object-side surface of the first lens L1 to an image plane of the camera optical lens 10 along an optic axis is defined as TTL, and the camera optical lens 10 satisfies a condition of 0.03≤d13/TTL≤0.10. This can facilitate achieving ultra-thin lenses. As an example, 0.04≤d13/TTL≤0.08.

As an example, an F number (FNO) of the camera optical lens 10 is smaller than or equal to 1.96, thereby leading to a large aperture and high imaging performance.

As an example, an image height of the camera optical lens 10 is defined as IH, the total optical length from the object-side surface of the first lens L1 to an image plane of the camera optical lens 10 along an optic axis is defined as TTL, and the camera optical lens 10 satisfies a condition of TTL/IH≤2.24. This condition can facilitate achieving ultra-thin lenses.

As an example, a field of view (FOV) of the camera optical lens 10 is greater than or equal to 120°, thereby achieving the wide-angle performance.

As an example, the total optical length TTL of the camera optical lens 10 is smaller than or equal to 7.38 mm, which is beneficial for achieving ultra-thin lenses. As an example, the total optical length TTL of the camera optical lens 10 is smaller than or equal to 7.05 mm.

When the above relationship is satisfied, the camera optical lens 10 has good optical performance, and adopting a free-form surface can achieve matching of a design image area with an actual use area, to maximize the image quality of an effective area; and with these characteristics, the camera optical lens 10 is suitable for camera optical lens assembly of mobile phones and WEB camera optical lenses formed by imaging elements for high pixel such as CCD and CMOS.

In the following, examples will be used to describe the camera optical lens 10 of the present disclosure. The symbols recorded in each example will be described as follows. The focal length, the on-axis distance, the central curvature radius, and the on-axis thickness are all in units of mm.

TTL: Optical length (the total optical length from the object-side surface of the first lens L1 to the image plane of the camera optical lens along the optic axis), in a unit of mm.

F number (FNO): a ratio of an effective focal length of the camera optical lens to an entrance pupil diameter of the camera optical lens.

Table 1 and Table 2 shows design data of the camera optical lens 10 according to Embodiment 1 of the present disclosure. The object-side surface and the image-side surface of the seventh lens L7 are free-form surfaces.

TABLE 1

| | R | d | | nd | | vd |
|---|---|---|---|---|---|---|
| S1 | ∞ | d0= | -1.967 | | | |
| R1 | -15.953 | d1= | 0.398 | nd1 | 1.5444 | v1 | 56.43 |
| R2 | 1.778 | d2= | 1.472 | | | |
| R3 | 1.975 | d3= | 0.704 | nd2 | 1.5444 | v2 | 56.43 |
| R4 | -1.956 | d4= | 0.040 | | | |
| R5 | -8.186 | d5= | 0.280 | nd3 | 1.5660 | v3 | 37.70 |
| R6 | 163.478 | d6= | 0.401 | | | |
| R7 | 28.844 | d7= | 0.250 | nd4 | 1.6800 | v4 | 18.40 |

TABLE 1-continued

| | R | d | | nd | | vd |
|---|---|---|---|---|---|---|
| R8 | 2.327 | d8= | 0.068 | | | |
| R9 | 4.355 | d9= | 0.571 | nd5 | 1.5444 | v5 | 56.43 |
| R10 | -4.514 | d10= | 0.192 | | | |
| R11 | -4.288 | d11= | 0.764 | nd6 | 1.5444 | v6 | 56.43 |
| R12 | -0.995 | d12= | 0.040 | | | |
| R13 | 1.299 | d13= | 0.400 | nd7 | 1.6800 | v7 | 18.40 |
| R14 | 0.684 | d14= | 0.700 | | | |
| R15 | ∞ | d15= | 0.210 | ndg | 1.5168 | vg | 64.17 |
| R16 | ∞ | d16= | 0.221 | | | |

In the table, meanings of various symbols will be described as follows.

S1: aperture;

R: central curvature radius of a lens;

R1: central curvature radius of the object-side surface of the first lens L1;

R2: central curvature radius of the image-side surface of the first lens L1;

R3: central curvature radius of the object-side surface of the second lens L2;

R4: central curvature radius of the image-side surface of the second lens L2;

R5: central curvature radius of the object-side surface of the third lens L3;

R6: central curvature radius of the image-side surface of the third lens L3;

R7: central curvature radius of the object-side surface of the fourth lens L4;

R8: central curvature radius of the image-side surface of the fourth lens L4;

R9: central curvature radius of the object-side surface of the fifth lens L5;

R10: central curvature radius of the image-side surface of the fifth lens L5;

R11: central curvature radius of the object-side surface of the sixth lens L6;

R12: central curvature radius of the image-side surface of the sixth lens L6;

R13: central curvature radius of the object-side surface of the sixth lens L7;

R14: central curvature radius of the image-side surface of the sixth lens L7;

R15: central curvature radius of an object-side surface of the optical filter GF;

R16: central curvature radius of an image-side surface of the optical filter GF;

d: on-axis thickness of a lens, and an on-axis distance between lenses;

d0: on-axis distance from the aperture S1 to the object-side surface of the first lens L1;

d1: on-axis thickness of the first lens L1;

d2: on-axis distance from the image-side surface of the first lens L1 to the object-side surface of the second lens L2;

d3: on-axis thickness of the second lens L2;

d4: on-axis distance from the image-side surface of the second lens L2 to the object-side surface of the third lens L3;

d5: on-axis thickness of the third lens L3;

d6: on-axis distance from the image-side surface of the third lens L3 to the object-side surface of the fourth lens L4;

d7: on-axis thickness of the fourth lens L4;

d8: on-axis distance from the image-side surface of the fourth lens L4 to the object-side surface of the fifth lens L5;

d9: on-axis thickness of the fifth lens L5;

d10: on-axis distance from the image-side surface of the fifth lens L5 to the object-side surface of the sixth lens L6;
d11: on-axis thickness of the sixth lens L6;
d12: on-axis distance from the image-side surface of the fifth lens L6 to the object-side surface of the seventh lens L7;
d13: on-axis thickness of the seventh lens L7;
d14: on-axis distance from the image-side surface of the seventh lens L7 to the object-side surface of the optical filter GF and to the image plane;
d15: on-axis thickness of the optical filter GF;
d16: on-axis distance from the image-side surface of the optical filter GF to the image plane;
nd: refractive index of d line;
nd1: refractive index of d line of the first lens L1;
nd2: refractive index of d line of the second lens L2;
nd3: refractive index of d line of the third lens L3;
nd4: refractive index of d line of the fourth lens L4;
nd5: refractive index of d line of the fifth lens L5;
nd6: refractive index of d line of the sixth lens L6;
nd7: refractive index of d line of the seventh lens L7;
ndg: refractive index of d line of the optical filter GF;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
v6: abbe number of the sixth lens L6;
v7: abbe number of the seventh lens L7;
vg: abbe number of the optical filter GF.

Table 2 shows aspherical surface data of respective lens in the camera optical lens 10 according to Embodiment 1 of the present disclosure.

TABLE 2

| | Conic coefficient | Aspherical coefficients | | | | |
|---|---|---|---|---|---|---|
| | k | A4 | A6 | A8 | A10 | A12 |
| R1 | −9.6827E+00 | 1.9241E−01 | −1.6736E−01 | 1.2062E−01 | −6.8499E−02 | 2.8435E−02 |
| R2 | 9.6582E−01 | 2.3323E−01 | 6.0234E−03 | −4.9226E−01 | 1.3359E+00 | −2.0154E+00 |
| R3 | 4.1851E−01 | 5.1973E−03 | 1.3082E−01 | −1.0579E+00 | 5.1150E+00 | −1.5359E+01 |
| R4 | −1.0000E+01 | 3.5705E−01 | −1.8344E+00 | 6.9315E+00 | −1.9693E+01 | 3.9885E+01 |
| R5 | −1.0000E+01 | 3.8718E−01 | −2.0985E+00 | 7.4250E+00 | −1.9997E+01 | 3.6863E+01 |
| R6 | 1.0000E+01 | −2.2194E−01 | 3.0955E−02 | −2.7857E−01 | 1.2808E+00 | −3.5163E+00 |
| R7 | 7.0291E+00 | −4.2835E−01 | 2.8386E−01 | −4.4365E−01 | −1.3774E+00 | 8.2380E+00 |
| R8 | 9.6713E−01 | −6.2175E−01 | 1.8432E+00 | −4.4250E+00 | 7.1876E+00 | −7.7277E+00 |
| R9 | 3.7442E+00 | −4.9725E−01 | 1.9447E+00 | −4.1484E+00 | 5.5608E+00 | −4.8961E+00 |
| R10 | −1.9262E+00 | −6.2503E−02 | 2.4508E−01 | −4.5772E−01 | 4.9007E−01 | −3.6177E−01 |
| R11 | 2.2377E+00 | 2.4641E−01 | −3.1313E−01 | 3.7854E−01 | −3.8577E−01 | 2.5217E−01 |
| R12 | −6.0747E+00 | −1.7348E−01 | 3.8962E−01 | −6.6058E−01 | 8.4539E−01 | −7.3059E−01 |

| | Conic coefficient | Aspherical coefficients | | | |
|---|---|---|---|---|---|
| | k | A14 | A16 | A18 | A20 |
| R1 | −9.6827E+00 | −8.2431E−03 | 1.5670E−03 | −1.7474E−04 | 8.6512E−06 |
| R2 | 9.6582E−01 | 1.8744E+00 | −1.0517E+00 | 3.1844E−01 | −4.0439E−02 |
| R3 | 4.1851E−01 | 2.8906E+01 | −3.3510E+01 | 2.1935E+01 | −6.2665E+00 |
| R4 | −1.0000E+01 | −5.5190E+01 | 4.8873E+01 | −2.4899E+01 | 5.5271E+00 |
| R5 | −1.0000E+01 | −4.4352E+01 | 3.2187E+01 | −1.2339E+01 | 1.8697E+00 |
| R6 | 1.0000E+01 | 5.9891E+00 | −6.0975E+00 | 3.3268E+00 | −6.9527E−01 |
| R7 | 7.0291E+00 | −1.6015E+01 | 1.6064E+01 | −8.5249E+00 | 1.9004E+00 |
| R8 | 9.6713E−01 | 5.4439E+00 | −2.4177E+00 | 6.1274E−01 | −6.7588E−02 |
| R9 | 3.7442E+00 | 2.8211E+00 | −1.0342E+00 | 2.2420E−01 | −2.2668E−02 |
| R10 | −1.9262E+00 | 2.3290E−01 | −1.3136E−01 | 4.6520E−02 | −6.7927E−03 |
| R11 | 2.2377E+00 | −8.6207E−02 | 9.2506E−03 | 2.2213E−03 | −5.1906E−04 |
| R12 | −6.0747E+00 | 3.9931E−01 | −1.2955E−01 | 2.2601E−02 | −1.6298E−03 |

$$z=(cr^2)/[1+\{1-(k+1)(c^2r^2)\}^{1/2}]+A4x^4+A6x^6+A8x^8+A10x^{10}+A12x^{12}+A14x^{14}+A16x^{16}+A18x^{18}+A20x^{20} \qquad (1),$$

In Table 2, k is a conic coefficient, and A4, A6, A8, A10, A12, A14, A16, A18 and A20 are Aspherical coefficients, r is a vertical distance between a point on an aspherical curve and the optic axis, and z is an aspherical depth (a vertical distance between a point on an aspherical surface, having a distance of r from the optic axis, and a surface tangent to a vertex of the aspherical surface on the optic axis).

For convenience, an aspherical surface of each lens surface uses the aspherical surfaces shown in the above condition (1). However, the present disclosure is not limited to the aspherical polynomial form shown in the condition (1).

Table 3 shows free-form surface data in the camera optical lens 10 of Embodiment 1 of the present disclosure.

TABLE 3

| | Free-form surface coefficients | | | | | | | |
|---|---|---|---|---|---|---|---|---|
| | k | $X^4Y^0$ | $X^2Y^2$ | $X^0Y^4$ | $X^6Y^0$ | $X^4Y^2$ | $X^2Y^4$ | $X^0Y^6$ |
| R13 | −2.6226E+00 | −2.9368E−01 | −5.9001E−01 | −2.9212E−01 | 2.1315E−01 | 6.3813E−01 | 6.4294E−01 | 2.1129E−01 |
| R14 | −4.0156E+00 | −1.1852E−01 | −2.4229E−01 | −1.1609E−01 | 4.9846E−02 | 1.5369E−01 | 1.5626E−01 | 4.7042E−02 |
| | $X^4Y^6$ | $X^2Y^8$ | $X^0Y^{10}$ | $X^{12}Y^0$ | $X^{10}Y^2$ | $X^8Y^4$ | $X^6Y^6$ | $X^4Y^8$ |
| R13 | 1.1330E+00 | 5.6705E−01 | 1.1426E−01 | −6.0950E−02 | −3.6609E−01 | −9.1605E−01 | −1.2215E+00 | −9.1501E−01 |
| R14 | 7.0497E−02 | 3.5611E−02 | 7.2340E−03 | −1.6065E−03 | −9.6785E−03 | −2.4214E−02 | −3.2009E−02 | −2.4162E−02 |
| | $X^2Y^{12}$ | $X^0Y^{14}$ | $X^{16}Y^0$ | $X^{14}Y^2$ | $X^{12}Y^4$ | $X^{10}Y^6$ | $X^8Y^8$ | $X^6Y^{10}$ |
| R13 | 1.6921E−01 | 2.4016E−02 | −6.4382E−03 | −5.1484E−02 | −1.7985E−01 | −3.5969E−01 | −4.5007E−01 | −3.5933E−01 |
| R14 | 1.5278E−03 | 2.0886E−04 | −1.4671E−05 | −1.1643E−04 | −3.9242E−04 | −8.0738E−04 | −1.0237E−03 | −7.8180E−04 |
| | $X^8Y^{10}$ | $X^6Y^{12}$ | $X^4Y^{14}$ | $X^2Y^{16}$ | $X^0Y^{18}$ | $X^{20}Y^0$ | $X^{18}Y^2$ | $X^{16}Y^4$ |
| R13 | 1.2613E−01 | 8.4039E−02 | 3.6243E−02 | 8.9925E−03 | 1.0027E−03 | −6.7601E−05 | −6.6796E−04 | −3.0597E−03 |
| R14 | 1.2396E−06 | 3.5586E−06 | 3.2603E−06 | −4.1682E−06 | −2.6177E−07 | 4.3027E−08 | 4.6067E−07 | 1.3295E−06 |
| | $X^8Y^0$ | $X^6Y^2$ | $X^4Y^4$ | $X^2Y^6$ | $X^0Y^8$ | $X^{10}Y^0$ | $X^8Y^2$ | $X^6Y^4$ |
| R13 | −1.6735E−01 | −6.6467E−01 | −9.9791E−01 | −6.6941E−01 | −1.6726E−01 | 1.1364E−01 | 5.6659E−01 | 1.1335E+00 |
| R14 | −2.1009E−02 | −8.4548E−02 | −1.2782E−01 | −8.5712E−02 | −2.0339E−02 | 7.0961E−03 | 3.5471E−02 | 7.0672E−02 |
| | $X^2Y^{10}$ | $X^0Y^{12}$ | $X^{14}Y^0$ | $X^{12}Y^2$ | $X^{10}Y^4$ | $X^8Y^6$ | $X^6Y_8$ | $X^4Y^{10}$ |
| R13 | −3.6496E−01 | −6.0958E−02 | 2.4157E−02 | 1.6929E−01 | 5.0745E−01 | 8.4601E−01 | 8.4648E−01 | 5.0773E−01 |
| R14 | −9.6639E−03 | −1.5944E−03 | 2.1872E−04 | 1.5288E−03 | 4.6375E−03 | 7.6715E−03 | 7.7482E−03 | 4.5992E−03 |
| | $X^4Y^{12}$ | $X^2Y^{14}$ | $X^0Y^{16}$ | $X^{18}Y^0$ | $X^{16}Y^2$ | $X^{14}Y^4$ | $X^{12}Y^6$ | $X^{10}Y^8$ |
| R13 | −1.8090E−01 | −5.1749E−02 | −6.4141E−03 | 1.0024E−03 | 8.9868E−03 | 3.6084E−02 | 8.4236E−02 | 1.2631E−01 |
| R14 | −4.0770E−04 | −1.3499E−04 | −2.0402E−05 | −3.1564E−09 | 7.9800E−08 | −9.7556E−08 | −5.1762E−07 | −8.6804E−06 |
| | $X^{14}Y^6$ | $X^{12}Y^8$ | $X^{10}Y^{10}$ | $X^8Y^{12}$ | $X^6Y^{14}$ | $X^4Y^{16}$ | $X^2Y^{18}$ | $X^0Y^{20}$ |
| R13 | −8.2227E−03 | −1.4308E−02 | −1.7085E−02 | −1.4403E−02 | −8.0943E−03 | −2.9829E−03 | −6.4340E−04 | −6.7601E−05 |
| R14 | 3.4643E−06 | 9.5335E−06 | 1.1551E−05 | 3.8527E−06 | 4.2644E−07 | 3.6317E−06 | 3.8640E−06 | 3.0121E−07 |

$$z = \frac{cr^2}{1+\sqrt{1-(1+k)c^2r^2}} + \sum_{i=1}^{N} B_i E_i(x, y),$$

where k is a conic coefficient, Bi is an aspherical coefficient, r is a vertical distance between a point on a free-form surface and the optic axis, x is an x-direction component of r, y is a y-direction component of r, and z is the aspherical depth (a vertical distance between a point on an aspherical surface, having a distance of r from the optic axis, and a surface tangent to a vertex of the aspherical surface on the optic axis).

For convenience, each free-form surface uses an extended polynomial surface shown in the above formula (2). However, the present disclosure is not limited to the free-form surface polynomial form expressed by the formula (2).

Figure 2:
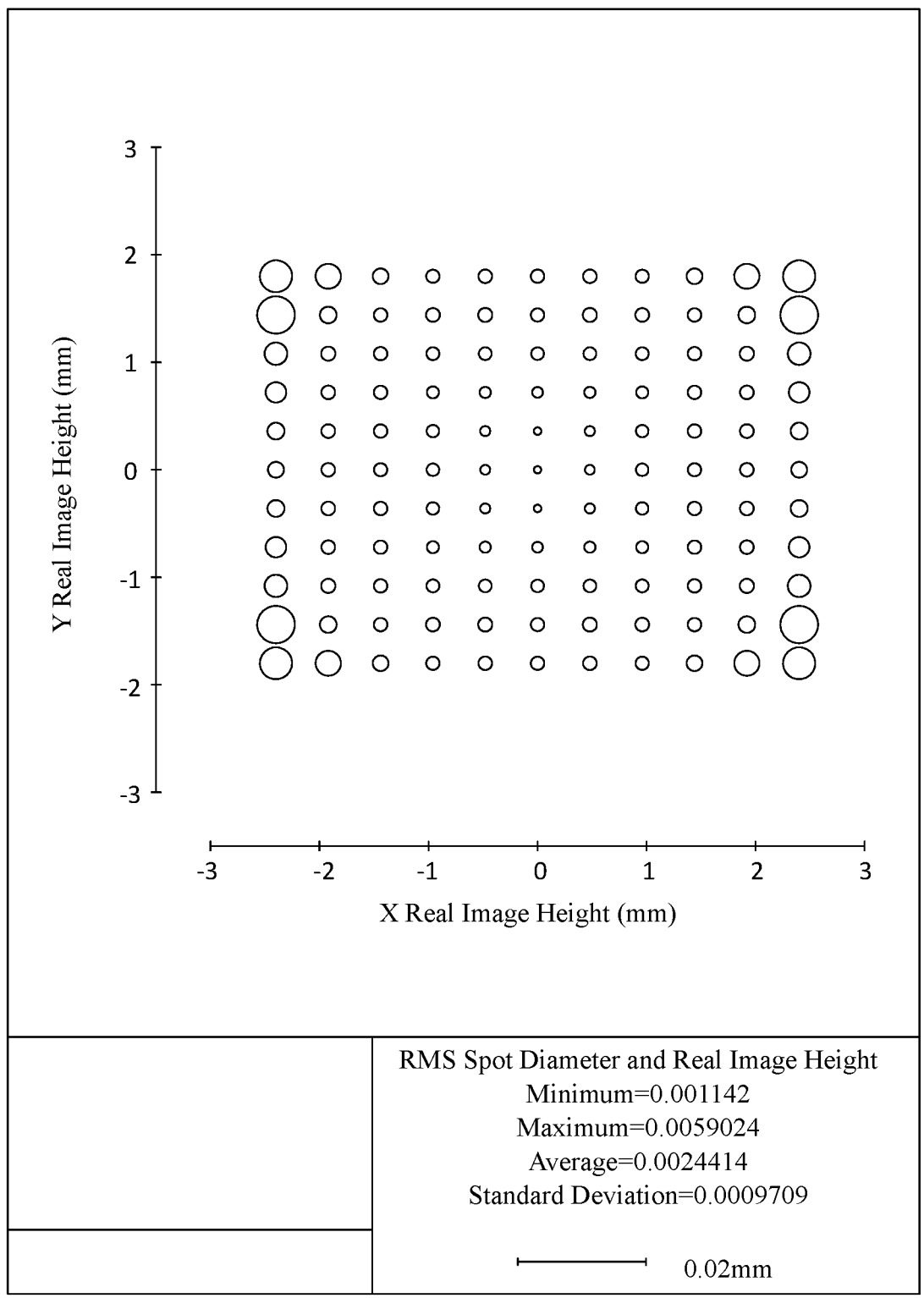
FIG. 2 is diagram showing a case where an RMS spot diameter of a camera optical lens shown in FIG. 1 is within a first quadrant.
Figure 3:
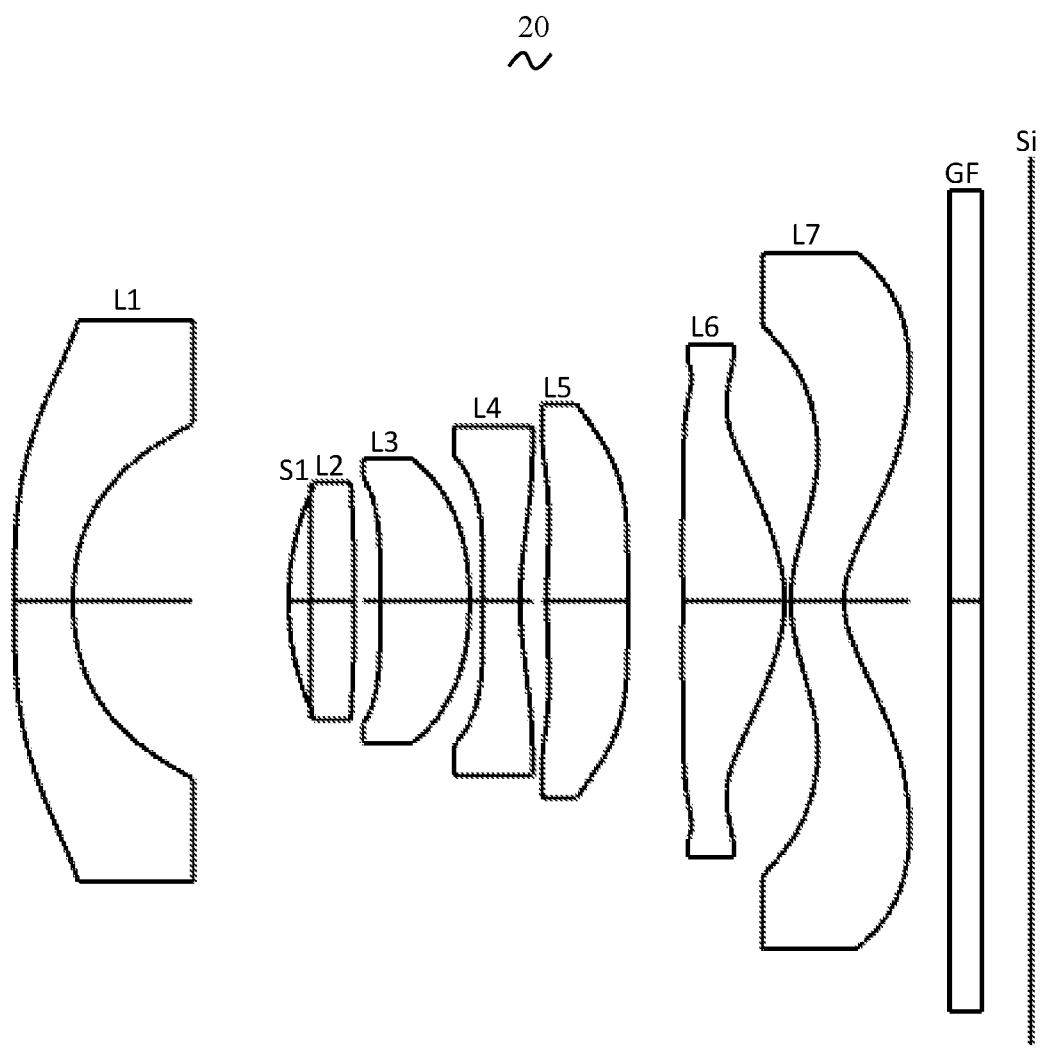
FIG. 3 is a schematic diagram of a structure of a camera optical lens in accordance with Embodiment 2 of the present disclosure.

FIG. 2 shows a case where an RMS spot diameter of the camera optical lens 10 of Embodiment 1 is within a first quadrant. According to FIG. 2, it can be known that the camera optical lens 10 of Embodiment 1 can achieve good imaging quality.

Table 13 below further lists various values of Embodiments 1, 2, 3, and 4 and values corresponding to parameters which are specified in the above conditions.

As shown in Table 13, Embodiment 1 satisfies the respective conditions.

In this embodiment, the entrance pupil diameter ENPD of the camera optical lens is 0.934 mm. The image height (along a diagonal direction) IH is 6.000 mm, an image height in the x direction is 4.800 mm, an image height in the y direction is 3.600 mm, and the imaging effect is the best in this rectangular range. The field of view (FOV) along a diagonal direction is 121.10°, an FOV in the x direction is 107.47°, and an FOV in the y direction is 91.24°. Thus, the camera optical lens 10 satisfies design requirements of ultra-thin, large-aperture, and wide-angle while having on-axis and off-axis aberrations sufficiently corrected, thereby leading to better optical characteristics.

Embodiment 2

Embodiment 2 is basically the same as Embodiment 1 and involves symbols having the same meanings as Embodiment 1. Only differences therebetween will be described in the following.

In this embodiment, the third lens L3 has a positive refractive power, the object-side surface of the first lens L1 is convex in the paraxial region, the image-side surface of the third lens L3 is convex in the paraxial region, and the image-side surface of the fifth lens L5 is concave in the paraxial region.

Table 4 and Table 5 show design data of a camera optical lens 20 in Embodiment 2 of the present disclosure. The object-side surface and image-side surface of the first lens L1 are free-form surfaces.

TABLE 4

| | R | d | | nd | | vd |
|---|---|---|---|---|---|---|
| S1 | ∞ | d0= | −1.953 | | | |
| R1 | 28.006 | d1= | 0.387 | nd1 | 1.5444 | v1 | 56.43 |
| R2 | 1.696 | d2= | 1.423 | | | |
| R3 | 2.005 | d3= | 0.433 | nd2 | 1.5510 | v2 | 45.00 |
| R4 | −19.774 | d4= | 0.174 | | | |
| R5 | −17.484 | d5= | 0.587 | nd3 | 1.5444 | v3 | 56.43 |
| R6 | −2.041 | d6= | 0.084 | | | |
| R7 | 24.716 | d7= | 0.250 | nd4 | 1.6800 | v4 | 18.40 |
| R8 | 2.461 | d8= | 0.177 | | | |
| R9 | 5.321 | d9= | 0.532 | nd5 | 1.5444 | v5 | 56.43 |
| R10 | 126.958 | d10= | 0.364 | | | |
| R11 | −9.684 | d11= | 0.673 | nd6 | 1.5444 | v6 | 56.43 |
| R12 | −0.975 | d12= | 0.040 | | | |
| R13 | 1.117 | d13= | 0.350 | nd7 | 1.6800 | v7 | 18.40 |
| R14 | 0.601 | d14= | 0.700 | | | |
| R15 | ∞ | d15= | 0.210 | ndg | 1.5168 | vg | 64.17 |
| R16 | ∞ | d16= | 0.325 | | | |

Table 5 shows aspherical data of respective lenses in the camera optical lens 20 according to Embodiment 2 of the present disclosure.

TABLE 5

| | Conic coefficient | Aspherical coefficients | | | | |
|---|---|---|---|---|---|---|
| | k | A4 | A6 | A8 | A10 | A12 |
| R3 | 1.1700E+00 | 1.5587E−03 | 5.0898E−02 | −2.2938E−01 | 9.6512E−01 | −2.6675E+00 |
| R4 | 1.0000E+01 | −3.3986E−02 | 9.9154E−02 | −6.9860E−01 | 3.5577E+00 | −1.0731E+01 |
| R5 | 1.0000E+01 | −1.1517E−01 | −9.6335E−02 | 5.3314E−03 | 6.8598E+00 | −4.4753E+00 |
| R6 | 9.9819E−01 | −7.1119E−02 | 4.8090E−02 | −2.1759E+00 | 1.0180E+01 | −2.4175E+01 |
| R7 | −1.0000E+01 | −1.6323E−01 | 1.4331E−01 | −2.0665E+00 | 6.8335E+00 | −1.1312E+01 |
| R8 | 1.2186E+00 | −2.3618E−01 | 4.7723E−01 | −1.7190E+00 | 3.7601E+00 | −5.0625E+00 |
| R9 | −5.1285E+00 | −2.0778E−01 | 6.9597E−02 | 3.9984E−01 | −1.3145E+00 | 1.8865E+00 |
| R10 | −1.0000E+01 | −3.9284E−02 | −4.1433E−01 | 8.6382E−01 | −1.1186E+00 | 9.5516E−01 |
| R11 | 1.0000E+01 | 2.8379E−01 | −5.6443E−01 | 6.5610E−01 | −5.6671E−01 | 3.9423E−01 |
| R12 | −5.7821E+00 | −1.1318E−02 | 1.5851E−02 | −6.4114E−02 | 6.0577E−02 | 5.7260E−03 |
| R13 | −2.4323E+00 | −2.9891E−01 | 2.3994E−01 | −2.9510E−01 | 3.0219E−01 | −1.9473E−01 |
| R14 | −3.5923E+00 | −8.3718E−02 | −2.7882E−02 | 5.7065E−02 | −3.5326E−02 | 1.2495E−02 |

| | Conic coefficient | Aspherical coefficients | | | |
|---|---|---|---|---|---|
| | k | A14 | A16 | A18 | A20 |
| R3 | 1.1700E+00 | 5.0077E+00 | −6.0519E+00 | 4.2163E+00 | −1.2727E+00 |
| R4 | 1.0000E+01 | 1.9945E+01 | −2.2664E+01 | 1.4571E+01 | −4.0577E+00 |
| R5 | 1.0000E+01 | 1.2424E+01 | −1.9075E+01 | 1.5135E+01 | −4.6984E+00 |
| R6 | 9.9819E−01 | 3.3731E+01 | −2.8025E+01 | 1.2815E+01 | −2.4661E+00 |
| R7 | −1.0000E+01 | 1.0211E+01 | −4.6417E+00 | 6.8762E−01 | 8.1202E−02 |
| R8 | 1.2186E+00 | 4.3216E+00 | −2.2637E+00 | 6.5841E−01 | −8.1159E−02 |
| R9 | −5.1285E+00 | −1.4151E+00 | 5.7586E−01 | −1.2015E−01 | 9.9311E−03 |
| R10 | −1.0000E+01 | −5.2970E−01 | 1.8730E−01 | −3.9483E−02 | 3.9037E−03 |
| R11 | 1.0000E+01 | −1.9815E−01 | 6.3684E−02 | −1.1554E−02 | 8.9561E−04 |
| R12 | −5.7821E+00 | −2.4908E−02 | 1.0889E−02 | −1.9497E−03 | 1.2968E−04 |
| R13 | −2.4323E+00 | 7.7008E−02 | −1.8348E−02 | 2.4247E−03 | −1.3643E−04 |
| R14 | −3.5923E+00 | −2.7759E−03 | 3.8428E−04 | −3.0481E−05 | 1.0635E−06 |

Table 6 shows free-form surface data in the camera optical lens 20 of Embodiment 2 of the present disclosure.

TABLE 6

| | Free-form surface coefficients | | | | | | | |
|---|---|---|---|---|---|---|---|---|
| | k | $X^4Y^0$ | $X^2Y^2$ | $X^0Y^4$ | $X^6Y^0$ | $X^4Y^2$ | $X^2Y^4$ | $X^0Y^6$ |
| R1 | −3.2353E+00 | 1.3026E−01 | 2.6134E−01 | 1.3017E−01 | −9.0669E−02 | −2.7382E−01 | −2.7305E−01 | −9.0648E−02 |
| R2 | 7.0197E−01 | 1.5694E−01 | 3.1640E−01 | 1.5671E−01 | 2.6095E−02 | 6.9905E−02 | 7.4047E−02 | 2.4494E−02 |

TABLE 6-continued

| | $X^4Y^6$ | $X^2Y^8$ | $X^0Y^{10}$ | $X^{12}Y^0$ | $X^{10}Y^2$ | $X^8Y^4$ | $X^6Y^6$ | $X^4Y^8$ |
|---|---|---|---|---|---|---|---|---|
| R1 | −1.7373E−01 | −8.7145E−02 | −1.7444E−02 | 3.9817E−03 | 2.3827E−02 | 5.9309E−02 | 7.9125E−02 | 5.9790E−02 |
| R2 | 5.2911E+00 | 2.6411E+00 | 5.1854E−01 | −4.8303E−01 | −2.8664E+00 | −7.3535E+00 | −9.7242E+00 | −7.1766E+00 |

| | $X^2Y^{12}$ | $X^0Y^{14}$ | $X^{16}Y^0$ | $X^{14}Y^2$ | $X^{12}Y^4$ | $X^{10}Y^6$ | $X^8Y^8$ | $X^6Y^{10}$ |
|---|---|---|---|---|---|---|---|---|
| R1 | −3.5190E−03 | −5.1274E−04 | 2.9258E−05 | 2.3245E−04 | 8.1426E−04 | 1.5768E−03 | 1.9961E−03 | 1.6819E−03 |
| R2 | 1.6765E+00 | 2.4346E−01 | −4.9861E−02 | −3.8738E−01 | −1.3874E+00 | −2.8484E+00 | −3.5061E+00 | −2.6961E+00 |

| | $X^8Y^{10}$ | $X^6Y^{12}$ | $X^4Y^{14}$ | $X^2Y^{16}$ | $X^0Y^{18}$ | $X^{20}Y^0$ | $X^{18}Y^2$ | $X^{16}Y^4$ |
|---|---|---|---|---|---|---|---|---|
| R1 | 0.0000E+00 | 0.0000E+00 | 0.0000E+00 | 0.0000E+00 | 0.0000E+00 | 0.0000E+00 | 0.0000E+00 | 0.0000E+00 |
| R2 | 0.0000E+00 | 0.0000E+00 | 0.0000E+00 | 0.0000E+00 | 0.0000E+00 | 0.0000E+00 | 0.0000E+00 | 0.0000E+00 |

| | $X^8Y^0$ | $X^6Y^2$ | $X^4Y^4$ | $X^2Y^6$ | $X^0Y^8$ | $X^{10}Y^0$ | $X^8Y^2$ | $X^6Y^4$ |
|---|---|---|---|---|---|---|---|---|
| R1 | 4.7427E−02 | 1.9088E−01 | 2.8583E−01 | 1.9062E−01 | 4.7530E−02 | −1.7348E−02 | −8.6918E−02 | −1.7353E−01 |
| R2 | −2.9350E−01 | −1.1675E+00 | −1.7655E+00 | −1.1682E+00 | −2.8535E−01 | 5.2890E−01 | 2.6364E+00 | 5.3511E+00 |

| | $X^2Y^{10}$ | $X^0Y^{12}$ | $X^{14}Y^0$ | $X^{12}Y^2$ | $X^{10}Y^4$ | $X^8Y^6$ | $X^6Y^8$ | $X^4Y^{10}$ |
|---|---|---|---|---|---|---|---|---|
| R1 | 2.3817E−02 | 4.0022E−03 | −5.1926E−04 | −3.6132E−03 | −1.0782E−02 | −1.7761E−02 | −1.8161E−02 | −1.0870E−02 |
| R2 | −2.9227E+00 | −4.8480E−01 | 2.3297E−01 | 1.5953E+00 | 4.9324E+00 | 8.3015E+00 | 8.0514E+00 | 4.8172E+00 |

| | $X^4Y^{12}$ | $X^2Y^{14}$ | $X^0Y^{16}$ | $X^{18}Y^0$ | $X^{16}Y^2$ | $X^{14}Y^4$ | $X^{12}Y^6$ | $X^{10}Y^8$ |
|---|---|---|---|---|---|---|---|---|
| R1 | 7.9298E−04 | 2.1004E−04 | 2.7012E−05 | 0.0000E+00 | 0.0000E+00 | 0.0000E+00 | 0.0000E+00 | 0.0000E+00 |
| R2 | −1.3847E+00 | −4.2000E−01 | −5.4656E−02 | 0.0000E+00 | 0.0000E+00 | 0.0000E+00 | 0.0000E+00 | 0.0000E+00 |

| | $X^{14}Y^6$ | $X^{12}Y^8$ | $X^{10}Y^{10}$ | $X^8Y^{12}$ | $X^6Y^{14}$ | $X^4Y^{16}$ | $X^2Y^{18}$ | $X^0Y^{20}$ |
|---|---|---|---|---|---|---|---|---|
| R1 | 0.0000E+00 | 0.0000E+00 | 0.0000E+00 | 0.0000E+00 | 0.0000E+00 | 0.0000E+00 | 0.0000E+00 | 0.0000E+00 |
| R2 | 0.0000E+00 | 0.0000E+00 | 0.0000E+00 | 0.0000E+00 | 0.0000E+00 | 0.0000E+00 | 0.0000E+00 | 0.0000E+00 |

Figure 4:
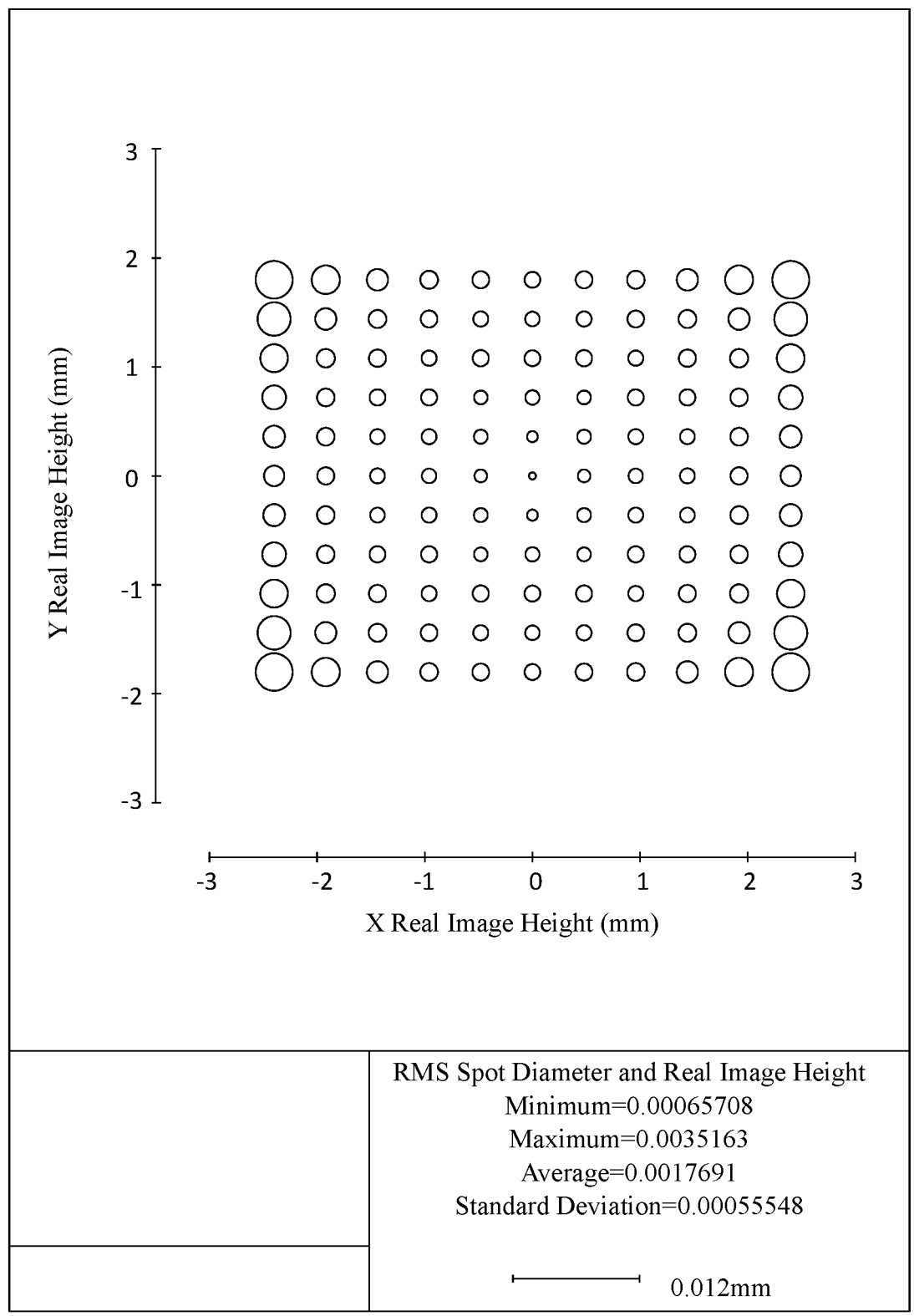
FIG. 4 is diagram showing a case where an RMS spot diameter of a camera optical lens shown in FIG. 3 is within a first quadrant.
Figure 5:
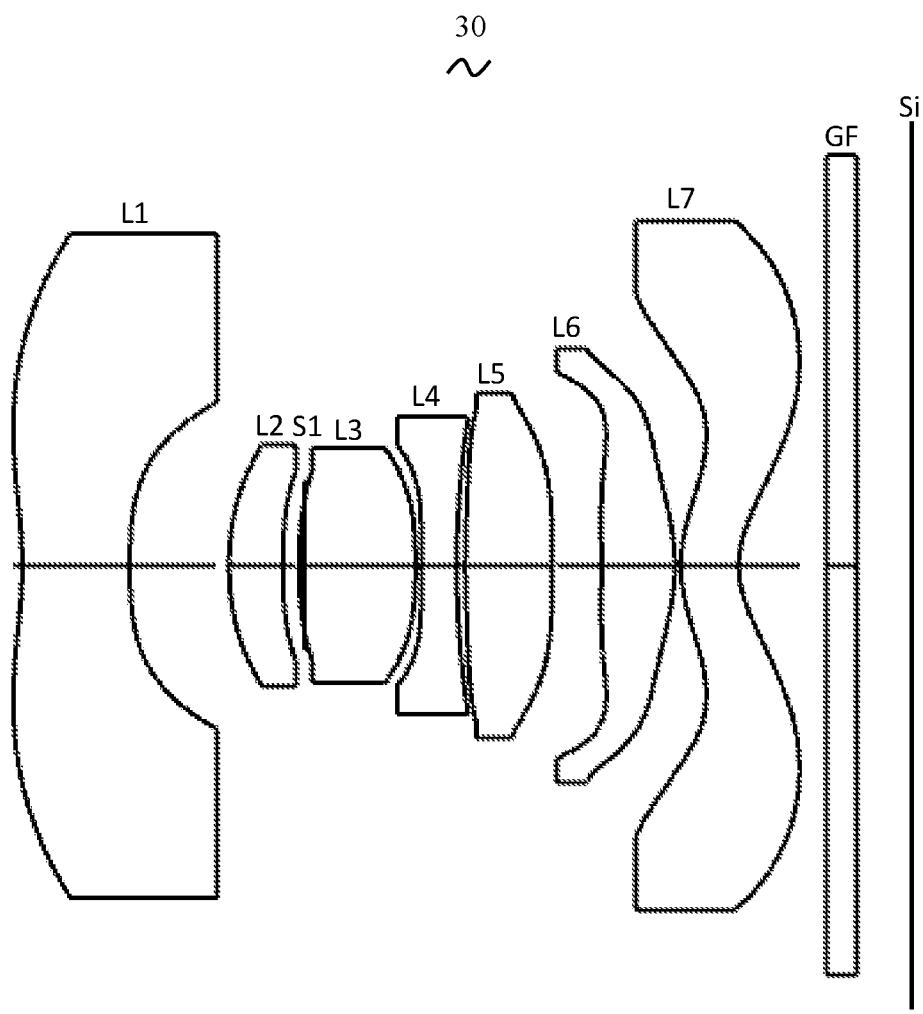
FIG. 5 is a schematic diagram of a structure of a camera optical lens in accordance with Embodiment 3 of the present disclosure.

FIG. 4 shows a situation where an RMS spot diameter of the camera optical lens 20 of Embodiment 2 is within a first quadrant. According to FIG. 4, it can be known that the camera optical lens 20 of Embodiment 2 can achieve good imaging quality.

As shown in Table 13, Embodiment 2 satisfies the respective conditions.

In this embodiment, the entrance pupil diameter ENPD of the camera optical lens is 0.982 mm. The image height (along a diagonal direction) IH is 6.000 mm, an image height in the x direction is 4.800 mm, an image height in the y direction is 3.600 mm, and the imaging effect is the best in this rectangular range. The field of view (FOV) along a diagonal direction is 121.23°, an FOV in the x direction is 105.39°, and an FOV in the y direction is 88.34°. Thus, the camera optical lens 20 satisfies design requirements of ultra-thin, large-aperture, and wide-angle while having on-axis and off-axis aberrations sufficiently corrected, thereby leading to better optical characteristics.

Embodiment 3

Embodiment 3 is basically the same as Embodiment 1 and involves symbols having the same meanings as Embodiment 1. Only differences therebetween will be described in the following.

In this embodiment, the camera optical lens 30 includes a first lens L1, a second lens L2, an aperture S1, a third lens L3, a fourth lens L4, a fifth lens L5, a sixth lens L6, and a seventh lens L7 that are sequentially arranged from an object side to an image side.

In this embodiment, the third lens L3 has a positive refractive power, the image-side surface of the second lens L2 is concave in the paraxial region, the object-side surface of the third lens L3 is convex in the paraxial region, the image-side surface of the third lens L3 is convex in the paraxial region, and the object-side surface of the fourth lens L4 is concave in the paraxial region.

Table 7 and Table 8 show design data of a camera optical lens 30 in Embodiment 3 of the present disclosure. The object-side surface and image-side surface of the first lens L1 are free-form surfaces.

TABLE 7

| | R | d | | nd | | vd |
|---|---|---|---|---|---|---|
| S1 | ∞ | d0= | −1.936 | | | |
| R1 | −2.673 | d1= | 0.737 | nd1 | 1.5444 | v1 | 56.43 |
| R2 | 4.838 | d2= | 0.680 | | | |
| R3 | 2.032 | d3= | 0.369 | nd2 | 1.6610 | v2 | 20.53 |
| R4 | 4.747 | d4= | 0.113 | | | |
| R5 | 3.815 | d5= | 0.798 | nd3 | 1.5444 | v3 | 56.43 |
| R6 | −3.955 | d6= | 0.042 | | | |
| R7 | −61.205 | d7= | 0.240 | nd4 | 1.6800 | v4 | 18.40 |
| R8 | 5.414 | d8= | 0.060 | | | |
| R9 | 4.854 | d9= | 0.598 | nd5 | 1.5444 | v5 | 56.43 |
| R10 | −11.635 | d10= | 0.337 | | | |
| R11 | −8.509 | d11= | 0.503 | nd6 | 1.5444 | v6 | 56.43 |
| R12 | −1.479 | d12= | 0.040 | | | |
| R13 | 1.022 | d13= | 0.397 | nd7 | 1.6032 | v7 | 28.29 |
| R14 | 0.682 | d14= | 0.600 | | | |
| R15 | ∞ | d15= | 0.210 | ndg | 1.5168 | vg | 64.17 |
| R16 | ∞ | d16= | 0.377 | | | |

Table 8 shows aspherical data of respective lenses in the camera optical lens 30 according to Embodiment 3 of the present disclosure.

TABLE 8

| | Conic coefficient | Aspherical coefficients | | | | |
|---|---|---|---|---|---|---|
| | k | A4 | A6 | A8 | A10 | A12 |
| R3  | −4.7627E+00 | 1.9135E−01 | −2.2936E−01 | 1.1887E+00 | −4.6139E+00 | 1.0333E+01 |
| R4  | 1.0000E+01 | 2.2833E−01 | 3.4140E−03 | −5.8567E−01 | 2.0336E+00 | −3.8903E+00 |
| R5  | 9.1197E+00 | 1.7151E−01 | −1.3646E−01 | 7.5534E−02 | −5.4398E−02 | 4.3878E−02 |
| R6  | 1.0000E+01 | −2.5034E−01 | −2.7230E−01 | 3.1161E+00 | −2.0985E+01 | 7.6321E+01 |
| R7  | 1.0000E+01 | −2.1848E−01 | −1.7675E−01 | 1.7256E+00 | −1.5733E+01 | 5.6124E+01 |
| R8  | 5.9276E+00 | −2.0499E−01 | 9.5439E−01 | −2.3278E+00 | 2.1779E+00 | 1.5887E+00 |
| R9  | −3.8639E+00 | −3.4843E−01 | 9.2191E−01 | −1.4174E+00 | 1.6006E+00 | −1.8034E+00 |
| R10 | −1.0000E+01 | −8.0751E−02 | −8.1370E−02 | −2.7384E−01 | 1.2986E+00 | −2.5009E+00 |
| R11 | 1.0000E+01 | 3.9565E−01 | −8.6174E−01 | 1.7884E+00 | −3.0456E+00 | 3.5142E+00 |
| R12 | −3.5318E−01 | 3.2312E−01 | −4.7165E−01 | 1.2784E+00 | −2.1633E+00 | 2.0685E+00 |
| R13 | −2.6793E+00 | −2.5616E−01 | −4.2882E−02 | 3.3315E−01 | −4.4614E−01 | 3.0400E−01 |
| R14 | −2.2719E+00 | −2.9825E−01 | 2.5792E−01 | −1.7048E−01 | 7.7880E−02 | −2.3743E−02 |

| | Conic coefficient | Aspherical coefficients | | | |
|---|---|---|---|---|---|
| | k | A14 | A16 | A18 | A20 |
| R3  | −4.7627E+00 | −1.3843E+01 | 1.0256E+01 | −3.5010E+00 | 2.8276E−01 |
| R4  | 1.0000E+01 | 2.9422E+00 | 0.0000E+00 | 0.0000E+00 | 0.0000E+00 |
| R5  | 9.1197E+00 | 0.0000E+00 | 0.0000E+00 | 0.0000E+00 | 0.0000E+00 |
| R6  | 1.0000E+01 | −1.5063E+02 | 1.6461E+02 | −9.4300E+01 | 2.2259E+01 |
| R7  | 1.0000E+01 | −9.7707E+01 | 8.8708E+01 | −4.0175E+01 | 7.1528E+00 |
| R8  | 5.9276E+00 | −5.7542E+00 | 5.6059E+00 | −2.5054E+00 | 4.3802E−01 |
| R9  | −3.8639E+00 | 2.0714E+00 | −1.7108E+00 | 7.8888E−01 | −1.5117E−01 |
| R10 | −1.0000E+01 | 2.8640E+00 | −1.9781E+00 | 7.5168E−01 | −1.1930E−01 |
| R11 | 1.0000E+01 | −2.6755E+00 | 1.2826E+00 | −3.5061E−01 | 4.1643E−02 |
| R12 | −3.5318E−01 | −1.1897E+00 | 4.0876E−01 | −7.6968E−02 | 6.1015E−03 |
| R13 | −2.6793E+00 | −1.1693E−01 | 2.5708E−02 | −3.0179E−03 | 1.4685E−04 |
| R14 | −2.2719E+00 | 4.7167E−03 | −5.8490E−04 | 4.1016E−05 | −1.2390E−06 |

Table 9 shows free-form surface data in the camera optical lens 30 of Embodiment 3 of the present disclosure.

TABLE 9

| | Free-form surface coefficients | | | | | | | |
|---|---|---|---|---|---|---|---|---|
| | k | $X^4Y^0$ | $X^2Y^2$ | $X^0Y^4$ | $X^6Y^0$ | $X^4Y^2$ | $X^2Y^4$ | $X^0Y^6$ |
| R1 | −2.5000E+01 | 8.9604E−02 | 1.7945E−01 | 8.9595E−02 | −4.7060E−02 | −1.4144E−01 | −1.4129E−01 | −4.7062E−02 |
| R2 | −4.3505E+00 | 3.5476E−01 | 7.1162E−01 | 3.5392E−01 | −2.5992E−01 | −7.8085E−01 | −7.8109E−01 | −2.5687E−01 |

| | $X^4Y^6$ | $X^2Y^8$ | $X^0Y^{10}$ | $X^{12}Y^0$ | $X^{10}Y^2$ | $X^8Y^4$ | $X^6Y^6$ | $X^4Y^8$ |
|---|---|---|---|---|---|---|---|---|
| R1 | −6.6033E−02 | −3.2943E−02 | −6.6139E−03 | 1.4565E−03 | 8.7383E−03 | 2.1832E−02 | 2.9123E−02 | 2.1862E−02 |
| R2 | −3.9152E+00 | −2.0328E+00 | −4.0239E−01 | 5.0275E−01 | 3.0024E+00 | 7.6357E+00 | 1.0112E+01 | 7.4077E+00 |

| | $X^2Y^{12}$ | $X^0Y^{14}$ | $X^{16}Y^0$ | $X^{14}Y^2$ | $X^{12}Y^4$ | $X^{10}Y^6$ | $X^8Y^8$ | $X^6Y^{10}$ |
|---|---|---|---|---|---|---|---|---|
| R1 | −1.4416E−03 | −2.0370E−04 | 1.6586E−05 | 1.3231E−04 | 4.6536E−04 | 9.3017E−04 | 1.1606E−03 | 9.2775E−04 |
| R2 | −3.6553E+00 | −5.1410E−01 | 3.0925E−01 | 2.4943E+00 | 8.6685E+00 | 1.6978E+01 | 2.1582E+01 | 1.7671E+01 |

| | $X^8Y^{10}$ | $X^6Y^{12}$ | $X^4Y^{14}$ | $X^2Y^{16}$ | $X^0Y^{18}$ | $X^{20}Y^0$ | $X^{18}Y^2$ | $X^{16}Y^4$ |
|---|---|---|---|---|---|---|---|---|
| R1 | −7.2863E−05 | −4.8825E−05 | −2.1925E−05 | −5.4478E−06 | −7.2391E−07 | 0.0000E+00 | 0.0000E+00 | 0.0000E+00 |
| R2 | −9.6585E+00 | −6.4618E+00 | −2.6955E+00 | −6.2711E−01 | −8.2939E−02 | 0.0000E+00 | 0.0000E+00 | 0.0000E+00 |

| | $X^8Y^0$ | $X^6Y^2$ | $X^4Y^4$ | $X^2Y^6$ | $X^0Y^8$ | $X^{10}Y^0$ | $X^8Y^2$ | $X^6Y^4$ |
|---|---|---|---|---|---|---|---|---|
| R1 | 2.0516E−02 | 8.2167E−02 | 1.2319E−01 | 8.1992E−02 | 2.0557E−02 | −6.5993E−03 | −3.3011E−02 | −6.5938E−02 |
| R2 | 3.4558E−01 | 1.3596E+00 | 2.0450E+00 | 1.3794E+00 | 3.4404E−01 | −4.0114E−01 | −1.9587E+00 | −3.9816E+00 |

| | $X^2Y^{10}$ | $X^0Y^{12}$ | $X^{14}Y^0$ | $X^{12}Y^2$ | $X^{10}Y^4$ | $X^8Y^6$ | $X^6Y^8$ | $X^4Y^{10}$ |
|---|---|---|---|---|---|---|---|---|
| R1 | 8.7293E−03 | 1.4518E−03 | −2.0527E−04 | −1.4359E−03 | −4.3132E−03 | −7.1898E−03 | −7.1848E−03 | −4.3100E−03 |
| R2 | 3.0968E+00 | 4.9820E−01 | −5.1749E−01 | −3.6551E+00 | −1.0969E+01 | −1.8221E+01 | −1.8289E+01 | −1.0827E+01 |

| | $X^4Y^{12}$ | $X^2Y^{14}$ | $X^0Y^{16}$ | $X^{18}Y^0$ | $X^{16}Y^2$ | $X^{14}Y^4$ | $X^{12}Y^6$ | $X^{10}Y^8$ |
|---|---|---|---|---|---|---|---|---|
| R1 | 4.6528E−04 | 1.3514E−04 | 1.7103E−05 | −5.8594E−07 | −5.2200E−06 | −2.1279E−05 | −4.8579E−05 | −7.4716E−05 |
| R2 | 8.6396E+00 | 2.4059E+00 | 3.1868E−01 | −7.5538E−02 | −6.7953E−01 | −2.7171E+00 | −6.0687E+00 | −9.1600E+00 |

TABLE 9-continued

|    | $X^{14}Y^6$ | $X^{12}Y^8$ | $X^{10}Y^{10}$ | $X^8Y^{12}$ | $X^6Y^{14}$ | $X^4Y^{16}$ | $X^2Y^{18}$ | $X^0Y^{20}$ |
|----|-------------|-------------|----------------|-------------|-------------|-------------|-------------|-------------|
| R1 | 0.0000E+00  | 0.0000E+00  | 0.0000E+00     | 0.0000E+00  | 0.0000E+00  | 0.0000E+00  | 0.0000E+00  | 0.0000E+00  |
| R2 | 0.0000E+00  | 0.0000E+00  | 0.0000E+00     | 0.0000E+00  | 0.0000E+00  | 0.0000E+00  | 0.0000E+00  | 0.0000E+00  |

Figure 6:
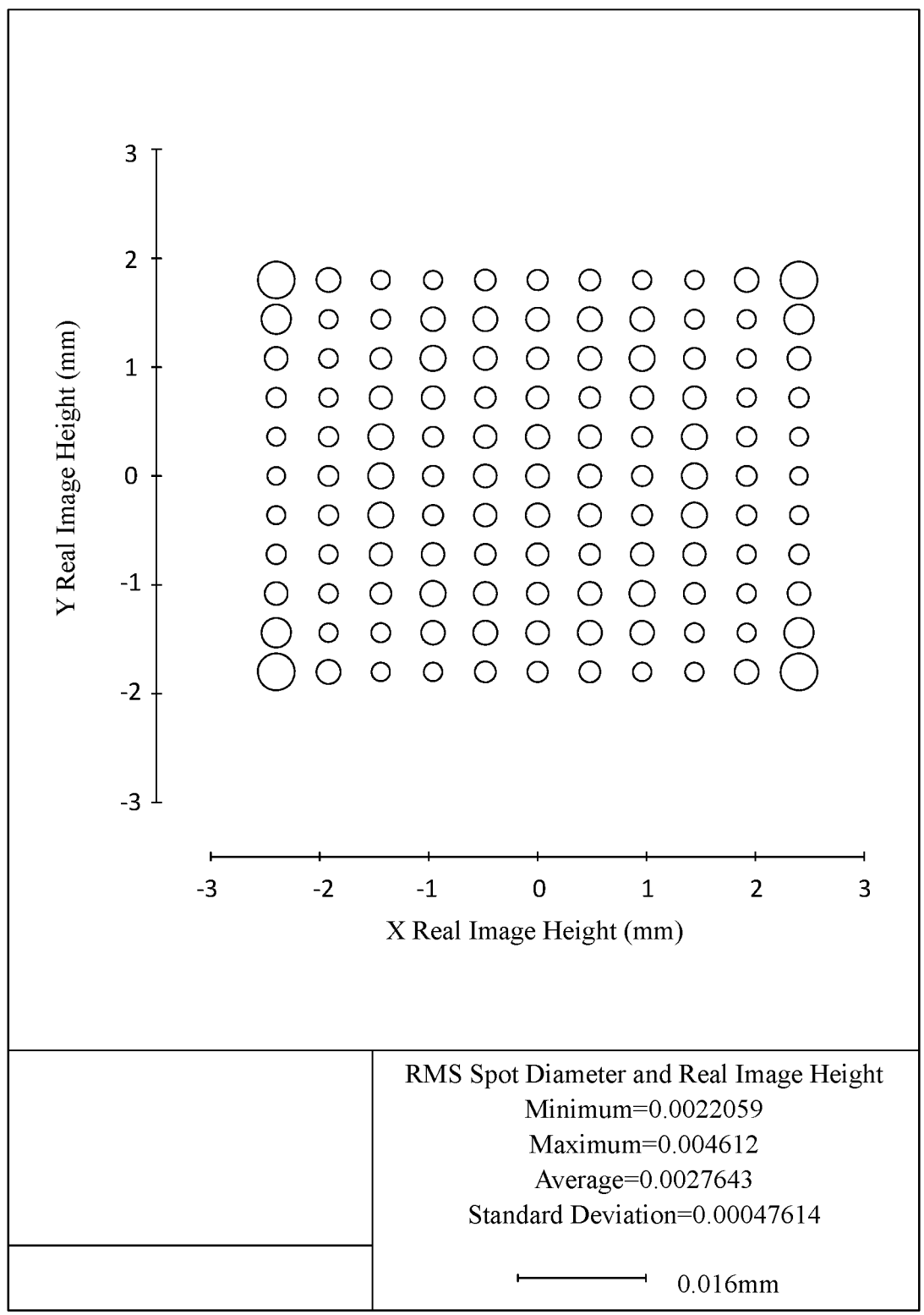
FIG. 6 is diagram showing a case where an RMS spot diameter of a camera optical lens shown in FIG. 5 is within a first quadrant.
Figure 7:
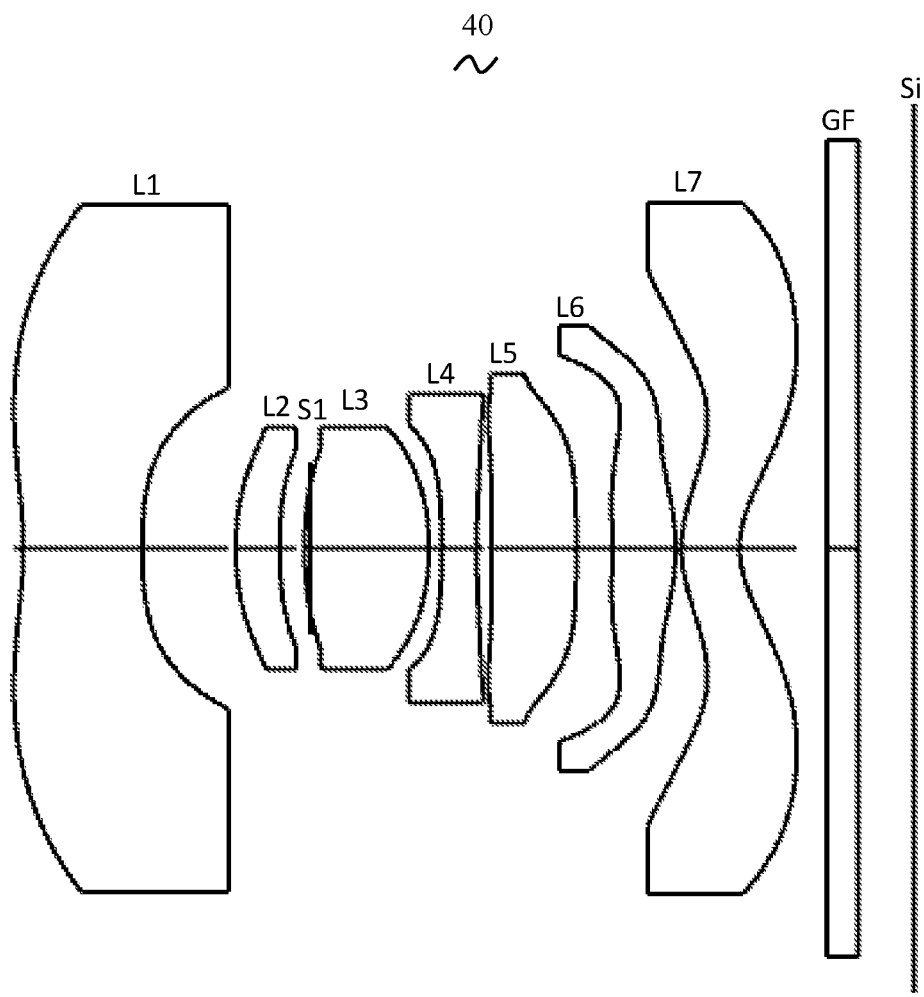
FIG. 7 is a schematic diagram of a structure of a camera optical lens in accordance with Embodiment 4 of the present disclosure.

FIG. 6 shows a situation where an RMS spot diameter of the camera optical lens 30 of Embodiment 3 is within a first quadrant. According to FIG. 6, it can be known that the camera optical lens 30 of Embodiment 3 can achieve good imaging quality.

Table 13 below further lists values corresponding to various conditions in this embodiment according to the above conditions. Obviously, the camera optical lens according to this embodiment satisfies the above conditions.

In this embodiment, the entrance pupil diameter ENPD of the camera optical lens is 0.923 mm. The image height (along a diagonal direction) IH is 6.000 mm, an image height in the x direction is 4.800 mm, an image height in the y direction is 3.600 mm, and the imaging effect is the best in this rectangular range. The field of view (FOV) along a diagonal direction is 120.00°, an FOV in the x direction is 107.30°, and an FOV in the y direction is 89.56°. Thus, the camera optical lens 30 satisfies design requirements of ultra-thin, large-aperture, and wide-angle while having on-axis and off-axis aberrations sufficiently corrected, thereby leading to better optical characteristics.

Embodiment 4

Embodiment 4 is basically the same as Embodiment 1 and involves symbols having the same meanings as Embodiment 1. Only differences therebetween will be described in the following.

In this embodiment, the camera optical lens 40 includes a first lens L1, a second lens L2, an aperture S1, a third lens L3, a fourth lens L4, a fifth lens L5, a sixth lens L6, and a seventh lens L7 that are sequentially arranged from an object side to an image side.

In this embodiment, The third lens L3 has a positive refractive power, the image-side surface of the second lens L2 is concave in the paraxial region, the object-side surface of the third lens L3 is convex in the paraxial region, the image-side surface of the third lens L3 is convex in the paraxial region, and the object-side surface of the fourth lens L4 is concave in the paraxial region.

Table 10 and Table 11 show design data of a camera optical lens 40 in Embodiment 4 of the present disclosure. The object-side surface and image-side surface of the second lens L2 are free-form surfaces.

TABLE 10

|     | R       | d        | nd     |     | vd    |
|-----|---------|----------|--------|-----|-------|
| S1  | ∞       | d0= −1.966 |      |     |       |
| R1  | −2.802  | d1= 0.816 | nd1  | 1.5444 v1 | 56.43 |
| R2  | 4.409   | d2= 0.639 |      |     |       |
| R3  | 2.008   | d3= 0.300 | nd2  | 1.6610 v2 | 20.53 |
| R4  | 3.410   | d4= 0.172 |      |     |       |
| R5  | 2.972   | d5= 0.853 | nd3  | 1.5444 v3 | 56.43 |
| R6  | −1.723  | d6= 0.087 |      |     |       |
| R7  | −5.867  | d7= 0.240 | nd4  | 1.6800 v4 | 18.40 |
| R8  | 6.874   | d8= 0.102 |      |     |       |
| R9  | 21.748  | d9= 0.580 | nd5  | 1.5444 v5 | 56.43 |
| R10 | −14.466 | d10= 0.248 |     |     |       |
| R11 | −5.492  | d11= 0.433 | nd6 | 1.5444 v6 | 56.43 |
| R12 | −1.470  | d12= 0.040 |     |     |       |
| R13 | 0.973   | d13= 0.398 | nd7 | 1.6032 v7 | 28.29 |
| R14 | 0.684   | d14= 0.600 |     |     |       |
| R15 | ∞       | d15= 0.210 | ndg | 1.5168 vg | 64.17 |
| R16 | ∞       | d16= 0.382 |     |     |       |

Table 11 shows aspherical data of respective lenses in the camera optical lens 40 according to Embodiment 4 of the present disclosure.

TABLE 11

|     | Conic coefficient | Aspherical coefficients | | | | |
|-----|------------------|------|------|------|------|------|
|     | k                | A4   | A6   | A8   | A10  | A12  |
| R1  | −2.5000E+01 | 8.1541E−02  | −3.9946E−02 | 1.6573E−02  | −5.0816E−03 | 1.0763E−03  |
| R2  | −9.5651E+00 | 3.5528E−01  | −2.7686E−01 | 4.9520E−01  | −8.1376E−01 | 1.1546E+00  |
| R5  | −7.1074E−01 | 1.2603E−01  | 1.3575E−02  | −5.1720E−01 | 2.0846E+00  | −5.9068E+00 |
| R6  | 1.0178E+00  | 4.4710E−02  | −1.1258E+00 | 7.0181E+00  | −2.9748E+01 | 8.1836E+01  |
| R7  | 9.7465E+00  | −1.3791E−02 | −1.1237E+00 | 4.7413E+00  | −1.5700E+01 | 3.1587E+01  |
| R8  | 1.0000E+01  | −7.2266E−04 | −5.4627E−01 | 2.6499E+00  | −7.2924E+00 | 1.2190E+01  |
| R9  | −1.0000E+01 | −1.2707E−01 | −2.8813E−01 | 1.5543E+00  | −2.5365E+00 | 1.3888E+00  |
| R10 | 9.0152E+00  | −5.1668E−02 | −9.7247E−02 | −1.0919E+00 | 3.8091E+00  | −6.3964E+00 |
| R11 | 1.0000E+01  | 5.9522E−01  | −9.3084E−01 | 1.1160E+00  | −1.2602E+00 | 1.1004E+00  |
| R12 | −3.0358E−01 | 3.5545E−01  | −9.7860E−02 | 3.6209E−01  | −1.0986E+00 | 1.3014E+00  |
| R13 | −2.5197E+00 | −3.1678E−01 | 1.4936E−01  | −8.8753E−02 | 4.3963E−02  | −7.9640E−03 |
| R14 | −2.5279E+00 | −2.4631E−01 | 1.6614E−01  | −9.2106E−02 | 4.0016E−02  | −1.2431E−02 |

|     | Conic coefficient | Aspherical coefficients | | | |
|-----|------------------|------|------|------|------|
|     | k                | A14  | A16  | A18  | A20  |
| R1  | −2.5000E+01 | −1.4676E−04 | 1.1649E−05  | −4.2486E−07 | 1.8496E−09  |
| R2  | −9.5651E+00 | −1.1503E+00 | 6.8010E−01  | −1.9207E−01 | 1.4517E−02  |
| R5  | −7.1074E−01 | 1.1577E+01  | −1.4320E+01 | 9.6107E+00  | −2.5849E+00 |
| R6  | 1.0178E+00  | −1.4175E+02 | 1.4892E+02  | −8.6621E+01 | 2.1387E+01  |
| R7  | 9.7465E+00  | −3.5728E+01 | 1.9627E+01  | −2.7794E+00 | −8.5906E−01 |

TABLE 11-continued

| | | | | | |
|---|---|---|---|---|---|
| R8  | 1.0000E+01  | −1.2441E+01 | 7.5932E+00  | −2.5544E+00 | 3.6448E−01  |
| R9  | −1.0000E+01 | 1.1808E+00  | −2.1852E+00 | 1.2081E+00  | −2.3996E−01 |
| R10 | 9.0152E+00  | 6.4941E+00  | −4.0231E+00 | 1.3957E+00  | −2.0630E−01 |
| R11 | 1.0000E+01  | −7.2948E−01 | 3.5046E−01  | −1.0708E−01 | 1.5045E−02  |
| R12 | −3.0358E−01 | −8.2611E−01 | 2.9945E−01  | −5.8442E−02 | 4.7772E−03  |
| R13 | −2.5197E+00 | −1.7880E−03 | 1.0007E−03  | −1.5362E−04 | 8.0815E−06  |
| R14 | −2.5279E+00 | 2.5763E−03  | −3.3456E−04 | 2.4490E−05  | −7.6785E−07 |

Table 12 shows free-form surface data in the camera optical lens 40 of Embodiment 4 of the present disclosure.

TABLE 12

| | Free-form surface coefficients | | | | | | |
|---|---|---|---|---|---|---|---|
| | k | $X^4Y^0$ | $X^2Y^2$ | $X^0Y^4$ | $X^6Y^0$ | $X^4Y^2$ | $X^2Y^4$ | $X^0Y^6$ |
| R3 | −5.8970E+00 | 2.2216E−01 | 4.4527E−01 | 2.2212E−01 | −2.6566E−01 | −8.0313E−01 | −7.9087E−01 | −2.6348E−01 |
| R4 | 6.1679E+00 | 1.8812E−01 | 3.7840E−01 | 1.8851E−01 | 2.7805E−02 | 3.9974E−02 | 1.1024E−01 | 2.3689E−02 |
| | $X^4Y^6$ | $X^2Y^8$ | $X^0Y^{10}$ | $X^{12}Y^0$ | $X^{10}Y^2$ | $X^8Y^4$ | $X^6Y^6$ | $X^4Y^8$ |
| R3 | −3.9938E+01 | −1.9876E+01 | −3.9404E+00 | 8.2596E+00 | 4.9582E+01 | 1.2364E+02 | 1.6546E+02 | 1.2459E+02 |
| R4 | 2.6778E+01 | 1.2539E+01 | 2.4815E+00 | −4.9963E+00 | −3.3086E+01 | −6.9913E+01 | −8.6955E+01 | −8.2488E+01 |
| | $X^2Y^{12}$ | $X^0Y^{14}$ | $X^{16}Y^0$ | $X^{14}Y^2$ | $X^{12}Y^4$ | $X^{10}Y^6$ | $X^8Y^8$ | $X^6Y^{10}$ |
| R3 | −6.7582E+01 | −9.6656E+00 | 4.5633E+00 | 3.6476E+01 | 1.2909E+02 | 2.5398E+02 | 3.2399E+02 | 2.4989E+02 |
| R4 | 2.3059E+01 | 4.2820E+00 | 0.0000E+00 | 0.0000E+00 | 0.0000E+00 | 0.0000E+00 | 0.0000E+00 | 0.0000E+00 |
| | $X^8Y^{10}$ | $X^6Y^{12}$ | $X^4Y^{14}$ | $X^2Y^{16}$ | $X^0Y^{18}$ | $X^{20}Y^0$ | $X^{18}Y^2$ | $X^{16}Y^4$ |
| R3 | 1.3528E+02 | 8.4123E+01 | 4.2376E+01 | 1.1314E+01 | 1.4044E+00 | −1.2764E+00 | −1.3245E+01 | −6.0486E+01 |
| R4 | 0.0000E+00 | 0.0000E+00 | 0.0000E+00 | 0.0000E+00 | 0.0000E+00 | 0.0000E+00 | 0.0000E+00 | 0.0000E+00 |
| | $X^8Y^0$ | $X^6Y^2$ | $X^4Y^4$ | $X^2Y^6$ | $X^0Y^8$ | $X^{10}Y^0$ | $X^8Y^2$ | $X^6Y^4$ |
| R3 | 1.0300E+00 | 4.1236E+00 | 6.1298E+00 | 4.1179E+00 | 1.0136E+00 | −3.9751E+00 | −1.9876E+01 | −3.9584E+01 |
| R4 | −7.9830E−01 | −3.0258E+00 | −4.8281E+00 | −3.3516E+00 | −7.7727E−01 | 2.5528E+00 | 1.3305E+01 | 2.3134E+01 |
| | $X^2Y^{10}$ | $X^0Y^{12}$ | $X^{14}Y^0$ | $X^{12}Y^2$ | $X^{10}Y^4$ | $X^8Y^6$ | $X^6Y^8$ | $X^4Y^{10}$ |
| R3 | 4.9400E+01 | 8.2669E+00 | −9.5902E+00 | −6.7228E+01 | −2.0147E+02 | −3.3576E+02 | −3.3565E+02 | −2.0134E+02 |
| R4 | −2.6505E+01 | −4.9523E+00 | 4.1475E+00 | 3.2255E+01 | 8.7391E+01 | 1.2058E+02 | 1.3351E+02 | 9.8290E+01 |
| | $X^4Y^{12}$ | $X^2Y^{14}$ | $X^0Y^{16}$ | $X^{18}Y^0$ | $X^{16}Y^2$ | $X^{14}Y^4$ | $X^{12}Y^6$ | $X^{10}Y^8$ |
| R3 | 1.3080E+02 | 3.7429E+01 | 4.4856E+00 | 1.0856E+00 | 1.0298E+01 | 3.9989E+01 | 9.0127E+01 | 1.4440E+02 |
| R4 | 0.0000E+00 | 0.0000E+00 | 0.0000E+00 | 0.0000E+00 | 0.0000E+00 | 0.0000E+00 | 0.0000E+00 | 0.0000E+00 |
| | $X^{14}Y^6$ | $X^{12}Y^8$ | $X^{10}Y^{10}$ | $X^8Y^{12}$ | $X^6Y^{14}$ | $X^4Y^{16}$ | $X^2Y^{18}$ | $X^0Y^{20}$ |
| R3 | −1.5293E+02 | −2.7845E+02 | −3.4532E+02 | −2.5479E+02 | −1.4186E+02 | −7.2968E+01 | −1.4776E+01 | −1.4621E+00 |
| R4 | 0.0000E+00 | 0.0000E+00 | 0.0000E+00 | 0.0000E+00 | 0.0000E+00 | 0.0000E+00 | 0.0000E+00 | 0.0000E+00 |

Figure 8:
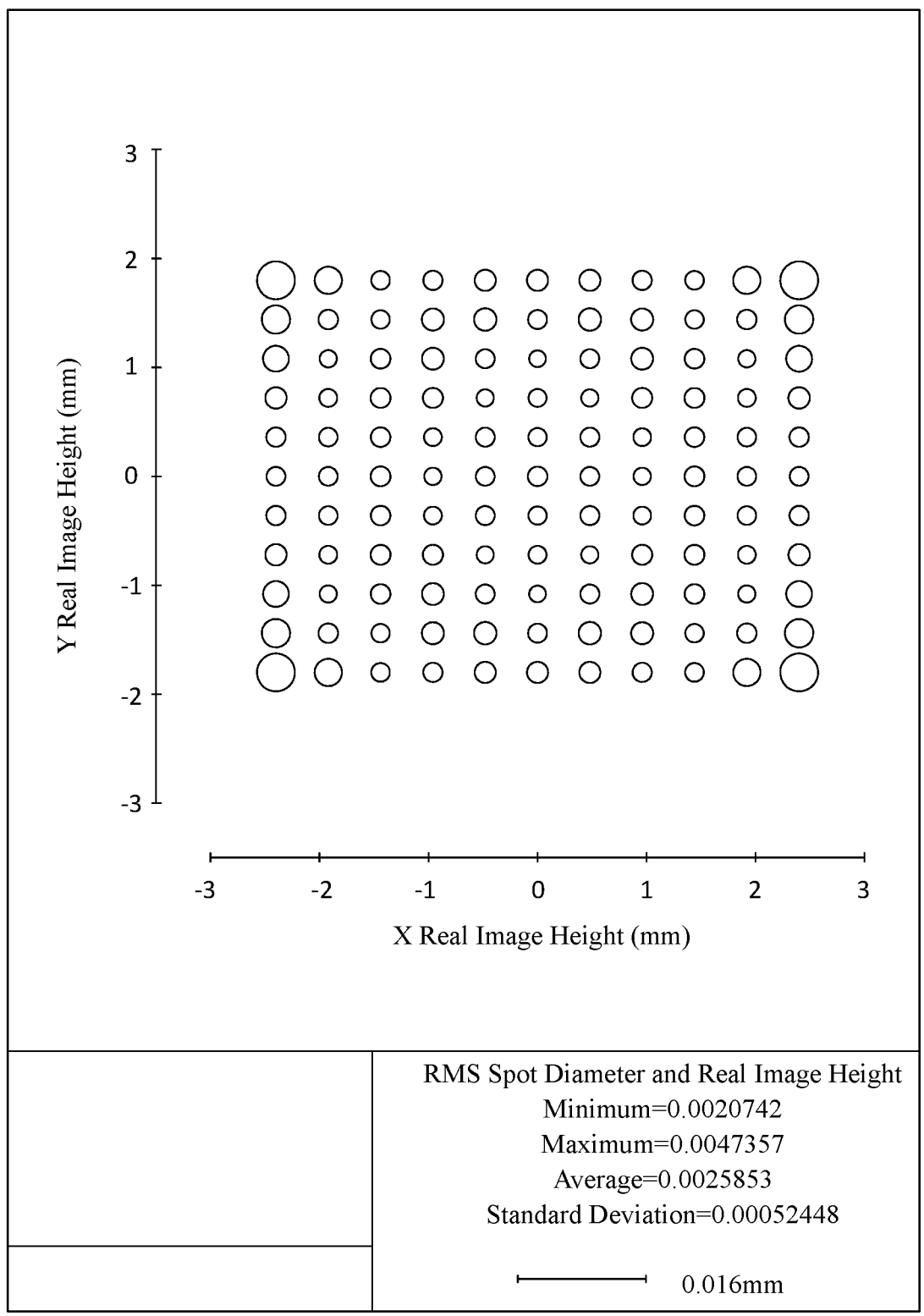
FIG. 8 is diagram showing a case where an RMS spot diameter of a camera optical lens shown in FIG. 7 is within a first quadrant.

FIG. 8 shows a situation where an RMS spot diameter of the camera optical lens 40 of Embodiment 4 is within a first quadrant. According to FIG. 8, it can be known that the camera optical lens 40 of Embodiment 4 can achieve good imaging quality.

Table 13 below further lists values corresponding to various conditions in this embodiment according to the above conditions. Obviously, the camera optical lens according to this embodiment satisfies the above conditions.

In this embodiment, the entrance pupil diameter ENPD of the camera optical lens is 0.923 mm. The image height (along a diagonal direction) IH is 6.000 mm, an image height in the x direction is 4.800 mm, an image height in the y direction is 3.600 mm, and the imaging effect is the best in this rectangular range. The field of view (FOV) along a diagonal direction is 120.00°, an FOV in the x direction is 107.29°, and an FOV in the y direction is 89.83°. Thus, the camera optical lens 40 satisfies design requirements of ultra-thin, large-aperture, and wide-angle while having on-axis and off-axis aberrations sufficiently corrected, thereby leading to better optical characteristics.

TABLE 13

| Parameters and Conditions | Embodiment 1 | Embodiment 2 | Embodiment 3 | Embodiment 4 |
|---|---|---|---|---|
| f4/f  | −2.14   | −2.20   | −4.02  | −2.54   |
| d5/d6 | 0.70    | 6.99    | 19.00  | 9.81    |
| f     | 1.728   | 1.816   | 1.800  | 1.800   |
| f1    | −2.907  | −3.323  | −3.047 | −3.016  |
| f2    | 1.921   | 3.314   | 5.054  | 6.745   |
| f3    | −13.699 | 4.174   | 3.689  | 2.134   |
| f4    | −3.700  | −3.998  | −7.233 | −4.575  |
| f5    | 4.153   | 10.153  | 6.352  | 15.997  |
| f6    | 2.193   | 1.931   | 3.198  | 3.541   |

TABLE 13-continued

| Parameters and Conditions | Embodiment 1 | Embodiment 2 | Embodiment 3 | Embodiment 4 |
|---|---|---|---|---|
| f7 | −2.866 | −2.616 | −6.053 | −7.886 |
| FNO | 1.85 | 1.85 | 1.95 | 1.95 |
| TTL | 6.711 | 6.709 | 6.101 | 6.100 |
| FOV | 121.10 | 121.23 | 120.00 | 120.00 |
| IH | 6.000 | 6.000 | 6.000 | 6.000 |

It can be appreciated by one having ordinary skill in the art that the description above is only embodiments of the present disclosure. In practice, one having ordinary skill in the art can make various modifications to these embodiments in forms and details without departing from the spirit and scope of the present disclosure.

What is claimed is:

1. A camera optical lens, comprising, from an object side to an image side:
a first lens having a negative refractive power;
a second lens having a positive refractive power;
a third lens;
a fourth lens having a negative refractive power;
a fifth lens having a positive refractive power;
a sixth lens having a positive refractive power; and
a seventh lens having a negative refractive power,
wherein at least one of the first lens, the second lens, the third lens, the fourth lens, the fifth lens, the sixth lens, or the seventh lens comprises a free-form surface, and
wherein the camera optical lens satisfies:

$-4.50 \leq f4/f \leq -2.00$;

$-3.66 \leq f1/f \leq -1.12$;

$-0.36 \leq (R1+R2)/(R1-R2) \leq 0.80$;

$-3.87 \leq (R3+R4)/(R3-R4) \leq 0.01$;

$2.50 \leq R11/R12 \leq 10.00$;

$0.03 \leq d1/TTL \leq 0.20$; and $0.65 \leq d5/d6 \leq 19.50$, where f denotes a focal length of the camera optical lens, f1 denotes a focal length of the first lens, f4 denotes a focal length of the fourth lens, R1 denotes a central curvature radius of an object-side surface of the first lens, R2 denotes a central curvature radius of an image-side surface of the first lens, R3 denotes a central curvature radius of an object-side surface of the second lens, R4 denotes a central curvature radius of an image-side surface of the second lens, R11 denotes a central curvature radius of an object-side surface of the sixth lens, R12 denotes a central curvature radius of an image-side surface of the sixth lens, d1 denotes an on-axis thickness of the first lens, d5 denotes an on-axis thickness of the third lens, d6 denotes an on-axis distance from an image-side surface of the third lens to an object-side surface of the fourth lens, and TTL denotes a total optical length from the object-side surface of the first lens to an image plane of the camera optical lens along an optic axis.

2. The camera optical lens as described in claim 1, wherein the camera optical lens further satisfies: $-5.20 \leq f7/f \leq -1.00$, where f7 denotes a focal length of the seventh lens.

3. The camera optical lens as described in claim 1, wherein the camera optical lens further satisfies:

$0.56 \leq f2/f \leq 5.62$; and $0.02 \leq d3/TTL \leq 0.16$, where f2 denotes a focal length of the second lens, d3 denotes an on-axis thickness of the second lens.

4. The camera optical lens as described in claim 1, wherein the camera optical lens further satisfies:

$-15.86 \leq f3/f \leq 3.45$;

$-1.81 \leq (R5+R6)/(R5-R6) \leq 1.90$; and $0.02 \leq d5/TTL \leq 0.21$, where f3 denotes a focal length of the third lens, R5 denotes a central curvature radius of an object-side surface of the third lens, R6 denotes a central curvature radius of the image-side surface of the third lens.

5. The camera optical lens as described in claim 1, wherein the camera optical lens further satisfies:

$-0.16 \leq (R7+R8)/(R7-R8) \leq 1.83$; and $0.02 \leq d7/TTL \leq 0.06$, where R7 denotes a central curvature radius of the object-side surface of the fourth lens, R8 denotes a central curvature radius of an image-side surface of the fourth lens, d7 denotes an on-axis thickness of the fourth lens.

6. The camera optical lens as described in claim 1, wherein the camera optical lens further satisfies:

$1.20 \leq f5/f \leq 13.33$;

$-2.17 \leq (R9+R10)/(R9-R10) \leq 0.30$; and $0.04 \leq d9/TTL \leq 0.15$, where f5 denotes a focal length of the fifth lens, R9 denotes a central curvature radius of an object-side surface of the fifth lens, R10 denotes a central curvature radius of an image-side surface of the fifth lens, d9 denotes an on-axis thickness of the fifth lens.

7. The camera optical lens as described in claim 1, wherein the camera optical lens further satisfies:

$0.53 \leq f6/f \leq 2.95$;

$0.61 \leq (R11+R12)/(R11-R12) \leq 2.60$; and $0.04 \leq d11/TTL \leq 0.17$, where f6 denotes a focal length of the sixth lens, R11 denotes a central curvature radius of an object-side surface of the sixth lens, R12 denotes a central curvature radius of an image-side surface of the sixth lens, d11 denotes an on-axis thickness of the sixth lens.

8. The camera optical lens as described in claim 1, wherein the camera optical lens further satisfies:

$1.61 \leq (R13+R14)/(R13-R14) \leq 8.60$; and $0.03 \leq d13/TTL \leq 0.10$, where R13 denotes a central curvature radius of an object-side surface of the seventh lens, R14 denotes a central curvature radius of an image-side surface of the seventh lens, d13 denotes an on-axis thickness of the seventh lens.

* * * * *